(12) United States Patent
Bennett et al.

(10) Patent No.: US 9,394,892 B1
(45) Date of Patent: Jul. 19, 2016

(54) PUMP ASSEMBLY AND SUPPORT

(71) Applicant: Hydro-Gear Limited Partnership, Sullivan, IL (US)

(72) Inventors: Michael L. Bennett, Sullivan, IL (US); Raymond Hauser, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 249 days.

(21) Appl. No.: 14/280,797

(22) Filed: May 19, 2014

Related U.S. Application Data

(63) Continuation of application No. 13/922,695, filed on Jun. 20, 2013, now Pat. No. 8,733,091, which is a continuation of application No. 13/295,628, filed on Nov. 14, 2011, now Pat. No. 8,468,819, which is a continuation of application No. 12/183,800, filed on Jul. 31, 2008, now Pat. No. 8,056,333.

(60) Provisional application No. 60/953,384, filed on Aug. 1, 2007.

(51) Int. Cl.
*F16H 61/42* (2010.01)
*F04B 17/05* (2006.01)

(52) U.S. Cl.
CPC .............. *F04B 17/05* (2013.01); *F16H 61/42* (2013.01)

(58) Field of Classification Search
CPC ................................. F04B 17/05; F16H 61/42
USPC ........................................... 60/484, 486, 487
See application file for complete search history.

(56) References Cited

U.S. PATENT DOCUMENTS

| | | | |
|---|---|---|---|
| 1,846,360 | A | 2/1932 | Rudolph |
| 1,942,064 | A | 1/1934 | Leveen |
| 3,122,944 | A | 3/1964 | Boehner et al. |
| 3,279,172 | A | 10/1966 | Kudo et al. |
| 3,300,698 | A | 1/1967 | Bopp et al. |
| 3,309,943 | A | 3/1967 | Kosman et al. |
| 3,748,851 | A | 7/1973 | Hause |
| 3,775,981 | A | 12/1973 | Molly |
| 4,132,278 | A | 1/1979 | Todeschini |
| 4,289,456 | A | 9/1981 | Ishihara |
| 4,574,902 | A | 3/1986 | Irimajiri |
| 4,676,065 | A | 6/1987 | Eberhardt |
| 4,698,975 | A | 10/1987 | Tsukamoto et al. |
| 4,738,328 | A | 4/1988 | Hayden |
| 4,809,796 | A | 3/1989 | Yamaoka et al. |
| 4,819,508 | A | 4/1989 | Yamaoka et al. |
| 4,969,319 | A | 11/1990 | Hutchison et al. |
| 5,031,591 | A | 7/1991 | Shinoda et al. |

(Continued)

FOREIGN PATENT DOCUMENTS

| | | |
|---|---|---|
| CA | 2465628 A1 | 8/2001 |
| EP | 0857264 B1 | 4/2002 |

*Primary Examiner* — Thomas E Lazo
(74) *Attorney, Agent, or Firm* — Neal, Gerber & Eisenberg LLP

(57) ABSTRACT

A pump assembly includes a pair of rotatable pumps located in a housing and engaged to a pump support disposed on a support surface on which the rotatable pumps are mounted. The pump support may include a pair of parallel side walls and a pair of bearing supports for a pair of pump shafts. Each pump shaft is driven by a separate pump gear, and a distance between an axis of rotation of a first pump shaft and an axis of rotation of a second pump shaft is less than a sum of: (a) a minor radius of the first pump gear, and (b) a minor radius of the second pump gear.

23 Claims, 30 Drawing Sheets

(56) References Cited

U.S. PATENT DOCUMENTS

| | | | |
|---|---|---|---|
| 5,067,933 A | 11/1991 | Hardesty et al. | |
| 5,078,222 A | 1/1992 | Hauser et al. | |
| 5,314,387 A | 5/1994 | Hauser et al. | |
| 5,458,100 A | 10/1995 | Neuenfeld | |
| 5,494,414 A | 2/1996 | Steinhart et al. | |
| 5,546,901 A | 8/1996 | Acker et al. | |
| 5,653,584 A | 8/1997 | Mazzucato et al. | |
| 5,823,752 A | 10/1998 | Hoenisch et al. | |
| 6,122,996 A | 9/2000 | Hauser et al. | |
| 6,253,637 B1 | 7/2001 | Hauser et al. | |
| 6,286,475 B1 | 9/2001 | Pierro | |
| 6,324,843 B1 | 12/2001 | Yasuda et al. | |
| 6,357,413 B1 | 3/2002 | Ito et al. | |
| 6,474,218 B2 | 11/2002 | Saito et al. | |
| 6,487,856 B1 * | 12/2002 | Ohashi | F04B 1/22 60/464 |
| 6,508,222 B2 | 1/2003 | Takano | |
| 6,524,203 B2 | 2/2003 | Kawamoto et al. | |
| 6,530,200 B1 | 3/2003 | Minoura et al. | |
| 6,530,218 B2 | 3/2003 | Saito et al. | |
| 6,578,656 B2 | 6/2003 | Samejima et al. | |
| 6,626,140 B2 | 9/2003 | Aichinger et al. | |
| 6,644,262 B2 | 11/2003 | Matsuda et al. | |
| 6,672,058 B1 | 1/2004 | Langenfeld et al. | |
| 6,672,843 B1 | 1/2004 | Holder et al. | |
| 6,675,696 B1 | 1/2004 | Langenfeld | |
| 6,698,199 B2 | 3/2004 | Hayashi et al. | |
| 6,758,290 B2 | 7/2004 | Jolliff et al. | |
| 6,779,615 B2 | 8/2004 | Boyer et al. | |
| 6,799,485 B1 | 10/2004 | Kawamoto et al. | |
| 6,820,403 B2 | 11/2004 | Umemoto | |
| 6,877,580 B2 | 4/2005 | Hasegawa et al. | |
| 6,889,651 B2 | 5/2005 | Tanaka et al. | |
| 6,904,889 B2 | 6/2005 | Matsuda et al. | |
| 6,996,981 B2 | 2/2006 | Ito et al. | |
| 7,000,388 B2 | 2/2006 | Saitou et al. | |
| 7,040,454 B2 | 5/2006 | Kawamoto et al. | |
| 7,051,840 B2 | 5/2006 | Tani | |
| 7,056,101 B1 | 6/2006 | Hauser et al. | |
| 7,062,909 B2 | 6/2006 | Ito et al. | |
| 7,188,697 B2 | 3/2007 | Ito et al. | |
| 7,219,646 B2 | 5/2007 | Ueshima | |
| 7,240,657 B2 | 7/2007 | Watanabe | |
| 7,325,527 B2 | 2/2008 | Hochmayr et al. | |
| 7,640,738 B1 * | 1/2010 | Hauser | A01D 69/03 60/484 |
| 7,658,128 B2 | 2/2010 | Sugano | |
| 8,056,333 B1 | 11/2011 | Bennett et al. | |
| 8,104,277 B1 | 1/2012 | Raymond | |
| 8,468,819 B1 | 6/2013 | Bennett et al. | |
| 2003/0070848 A1 | 4/2003 | Hasegawa et al. | |
| 2005/0145432 A1 | 7/2005 | Hasegawa et al. | |
| 2007/0155572 A1 | 7/2007 | Sugano | |
| 2007/0209456 A1 | 9/2007 | Irikura et al. | |
| 2007/0209457 A1 | 9/2007 | Irikura et al. | |
| 2012/0118272 A1 | 5/2012 | Rohs et al. | |

* cited by examiner

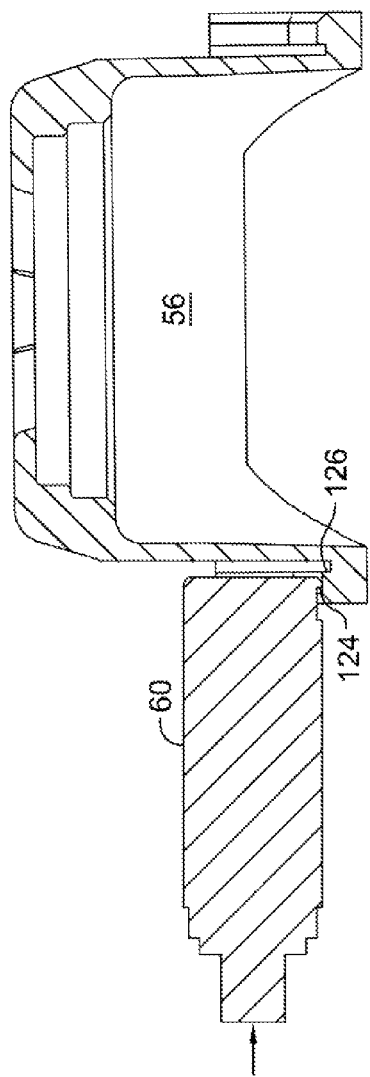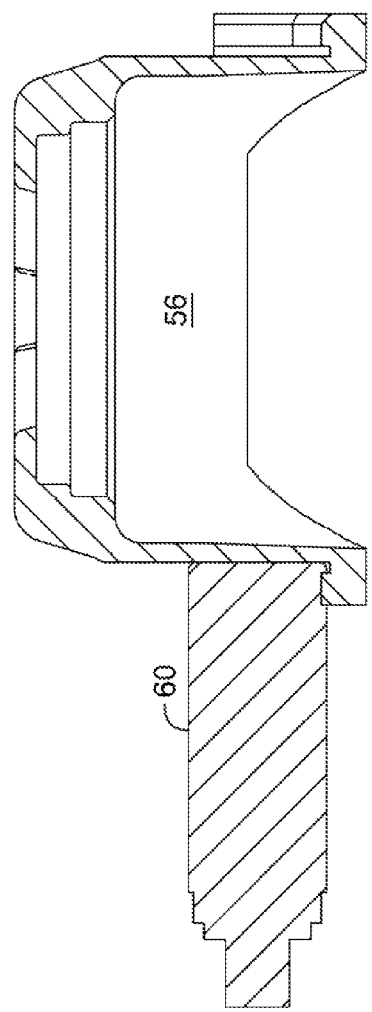

PUMP ASSEMBLY AND SUPPORT

RELATED APPLICATIONS

This application is a continuation of U.S. patent application Ser. No. 13/922,695, filed on Jun. 20, 2013, which is a continuation of U.S. patent application Ser. No. 13/295,628, filed on Nov. 14, 2011, now U.S. Pat. No. 8,468,819; which is a continuation of U.S. patent application Ser. No. 12/183,800, filed on Jul. 31, 2008, now U.S. Pat. No. 8,056,333; which claims priority to U.S. Provisional Pat. Appl. No. 60/953,384, filed on Aug. 1, 2007. Each patent application identified above is incorporated herein by reference in its entirety.

BACKGROUND OF THE INVENTION

This invention relates to vehicles; in particular, vehicles having a hydraulic drive with a plurality of pumps and a plurality of motors.

SUMMARY OF THE INVENTION

A drive train having an engine that drives a plurality of pumps and a vehicle incorporating such a drive train are disclosed herein. The pumps are formed as part of the engine assembly and share oil with the engine assembly. The details of the invention are set forth below in connection with the detailed description of the embodiments.

A better understanding of the invention will be obtained from the following detailed descriptions and accompanying drawings, which set forth illustrative embodiments that are indicative of the various ways in which the principals of the invention may be employed.

BRIEF DESCRIPTION OF THE DRAWINGS

FIG. 15 is a cross-sectional view similar to that of FIG. 14, showing a method of attaching the trunnion to the swash plate body.

FIG. 16 is a cross-sectional view similar to that of FIG. 14, showing an exemplary assembled swash plate and trunnion.

DETAILED DESCRIPTION OF THE DRAWINGS

Figure 1:
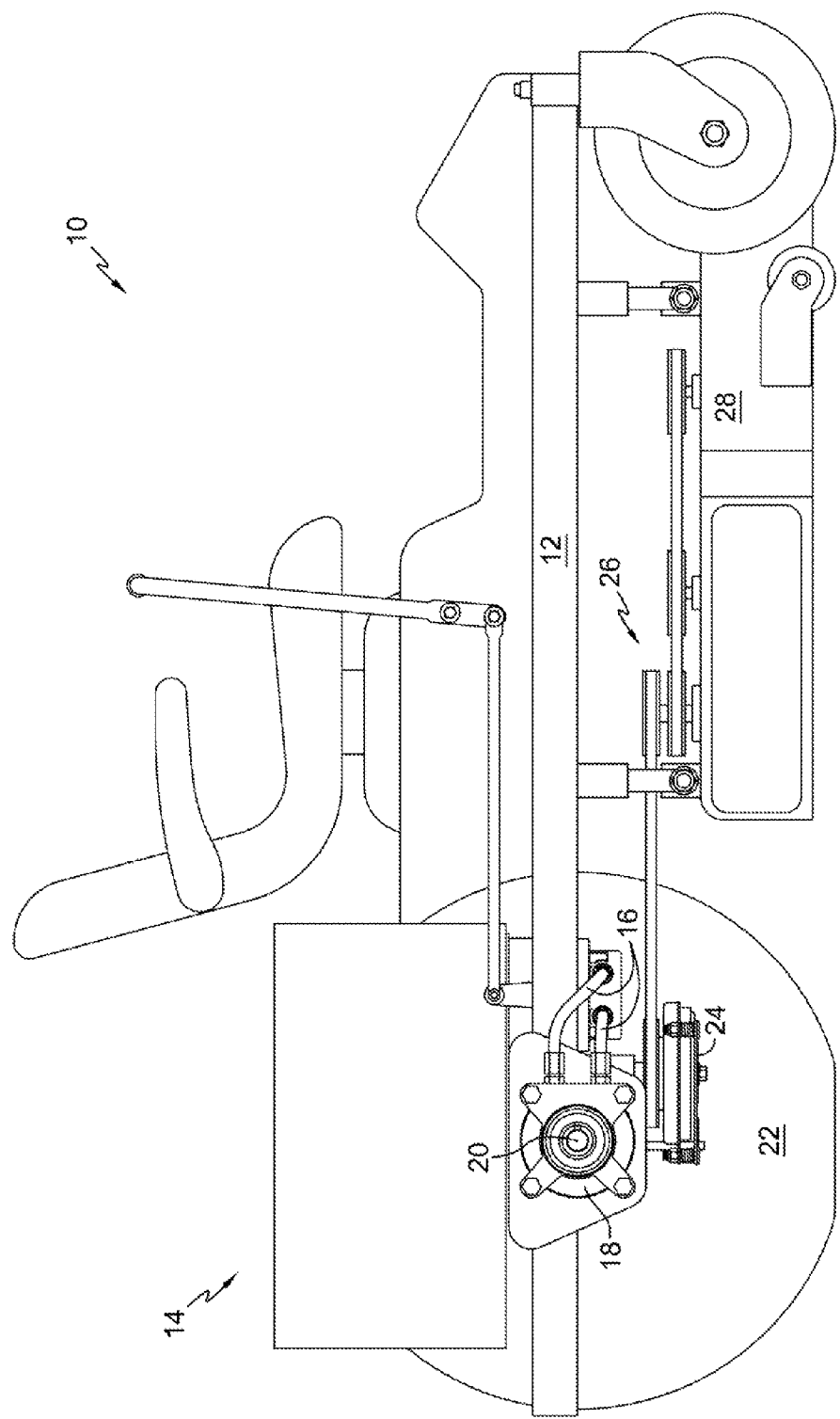
FIG. 1 is an elevational view of a vehicle incorporating a first embodiment of the present invention, with one tire removed for clarity.

FIG. 1 shows an exemplary vehicle 10. Vehicle 10 comprises a frame 12 on which is mounted an engine assembly 14. Hydraulic lines 16 extend from engine assembly 14 to hydraulic motors 18. Hydraulic motors 18 may drive axle shafts 20 which then propel tires 22.

Engine assembly 14 may drive a power take-off 24. Power take-off 24 may be electrically or hydraulically actuated. When power take-off 24 is engaged, it may connect power from engine assembly 14 to a mowing deck 28 by means of a belt and pulley system 26.

Engine assembly 14 provides the functions of a typical vehicle engine. However, engine assembly 14 also comprises novel features that simplify application, assembly, operation and serviceability of engine assembly 14. For example, pumps are usually connected to an engine output shaft. Such connection can be, for example, for gear train or by a system of belts and pulleys, and such pumps are external to the engine.

Figure 2:
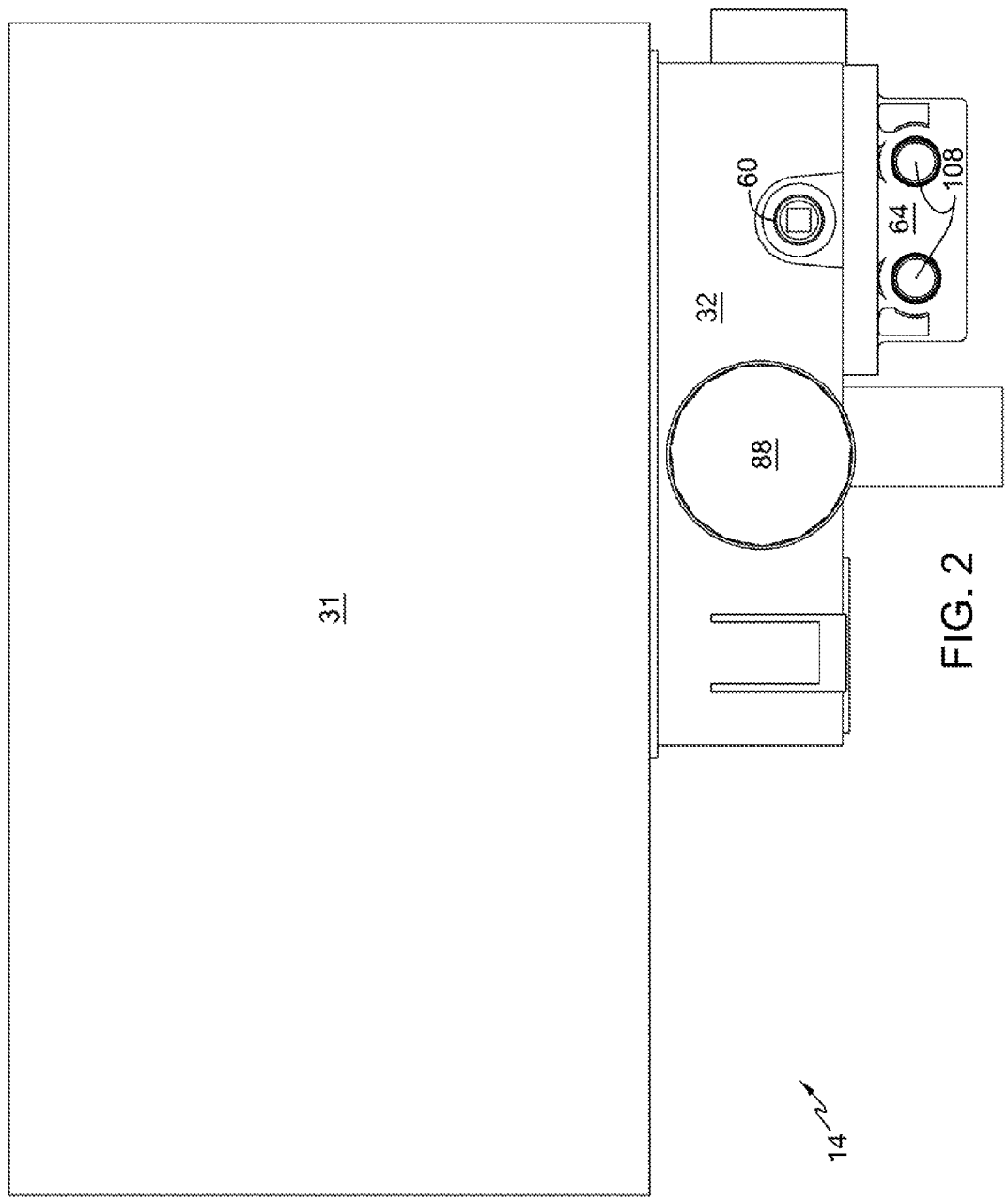
FIG. 2 is an elevational view of an exemplary engine assembly incorporating a first embodiment of the present invention.
Figure 3:
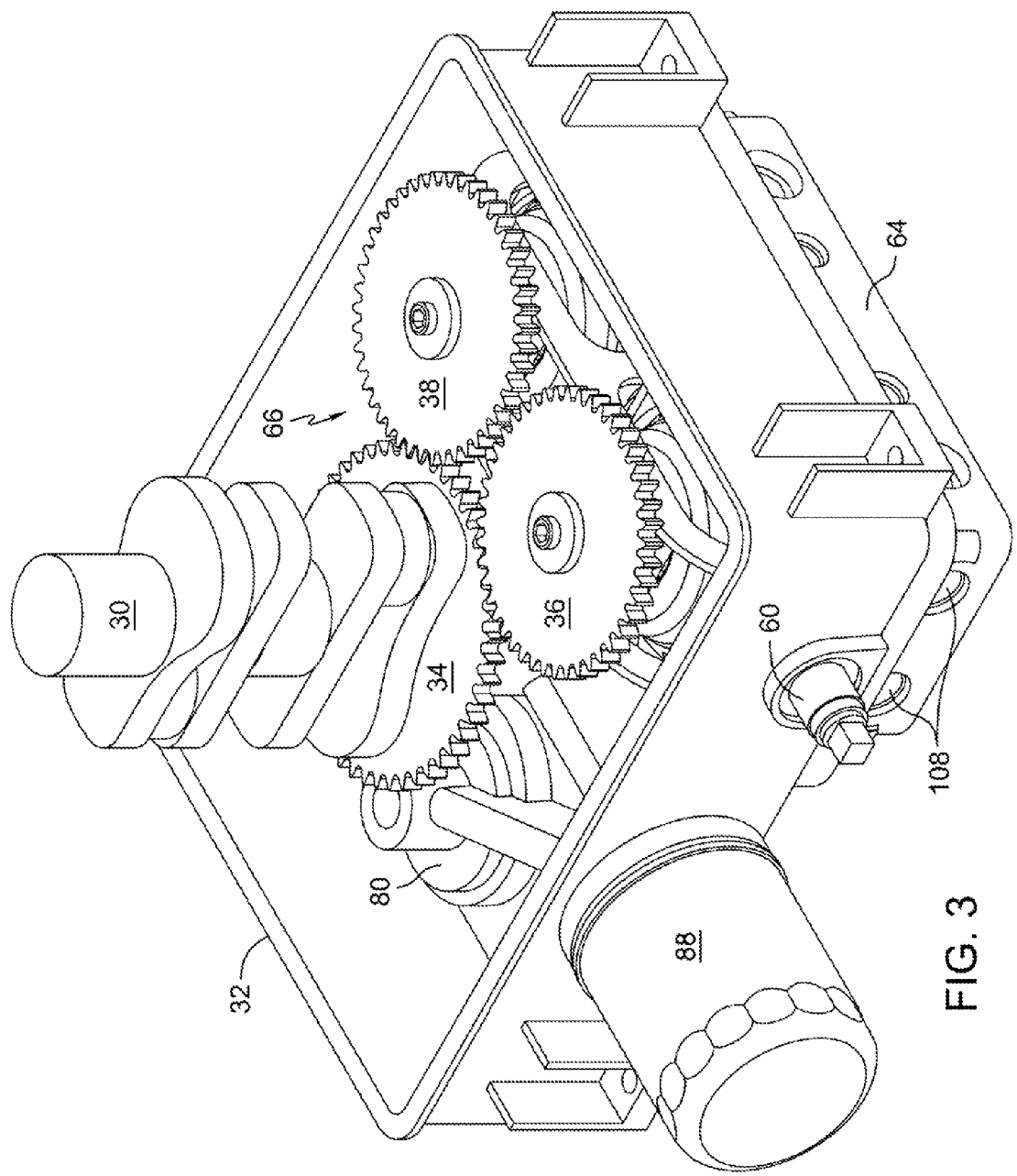
FIG. 3 is a perspective view of certain elements of the first embodiment of the present invention.
Figure 4:
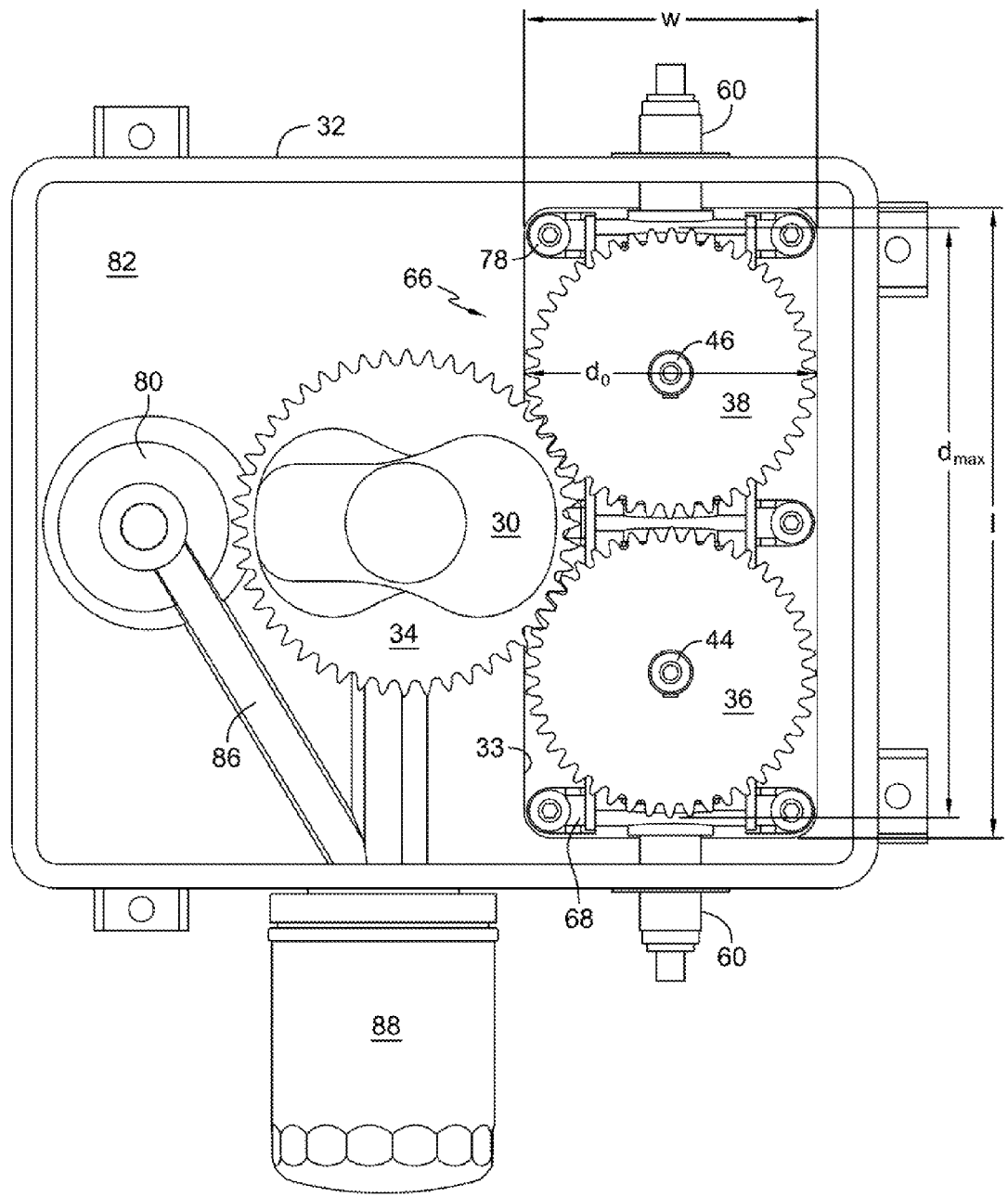
FIG. 4 is a plan view of certain elements of the first embodiment of the present invention.

A simplified view of engine assembly 14 is shown in FIG. 2. Engine assembly 14 comprises an upper engine housing 31 and a lower engine housing 32. As shown in FIGS. 3 and 4, crankshaft 30 is driven by elements of engine assembly 14 that are not shown. Crankshaft 30 extends into and may be supported by lower engine housing 32. Crankshaft 30 has a gear 34 mounted thereon that drives gears 36 and 38. Gears 36 and 38 are mounted on first pump shaft 44 and second pump shaft 46, respectively, which drive a first pump 40 and a second pump 42, respectively, which may be similar to the pumps shown in FIG. 6. Other suitable gear trains or mechanisms to transfer the rotation of crankshaft 30 to gears 36 and 38 are within the scope of the invention.

As described in detail below, the displacement and output of each pump 40 and 42 is independently controlled by rotating a trunnion 60. The rotation of trunnion 60 and the resulting control of the pumps may be accomplished electrically, hydraulically, or by mechanical linkage to manual operator controls.

The first pump 40 and the second pump 42 may be axial piston pumps. Axial piston pumps are well-known in the art, so only a minimal explanation of these devices is provided herein.

First gear 36 is attached to and drives first pump shaft 44. Second gear 38 is attached to and drives second pump shaft 46. First pump shaft 44 drives a first cylinder block 48, which provides a location for a plurality of pistons 50 and other elements appropriate to an axial piston pump. Similarly, second pump shaft 46 drives second cylinder block 52. The pistons 50 of each cylinder block interact with a swash plate assembly 54. Swash plate assemblies 54 may each comprise a swash plate body 56, a thrust bearing 58, and a trunnion 60.

The interaction of the various elements described above causes first and second cylinder block 48 and 52 to thrust against a support plate 64. Cylinder blocks 48 and 52 may thrust directly against support plate 64 or may thrust against a separate element supported on support plate 64, such as a valve plate (not shown). Support plate 64 may be called by various names, such as end cap, center section, hydraulic support member and porting plate.

Figure 6:
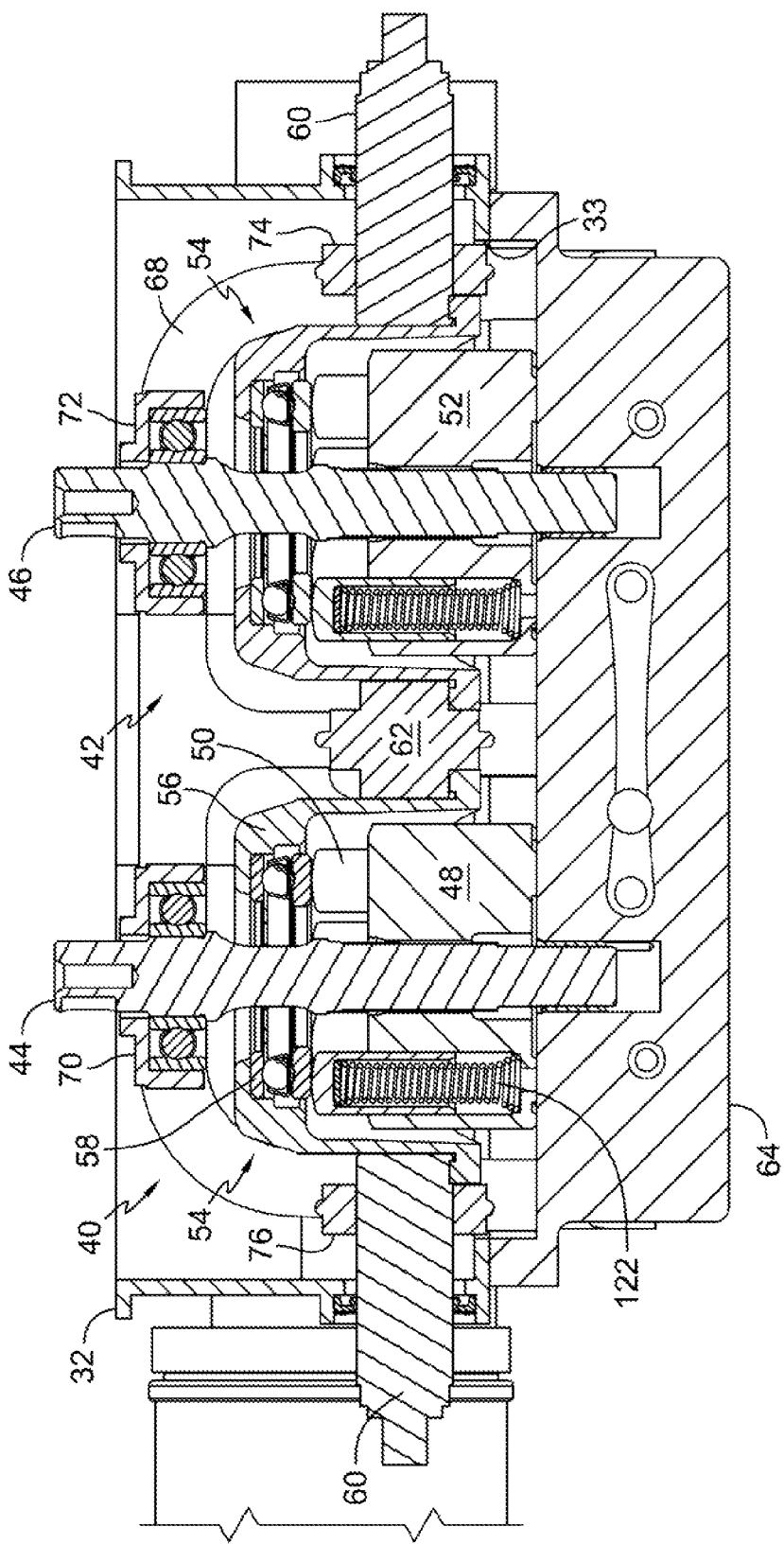
FIG. 6 is a cross-sectional view along the line 6-6 of FIG. 5, with some elements removed or simplified to improve clarity.
Figure 7:
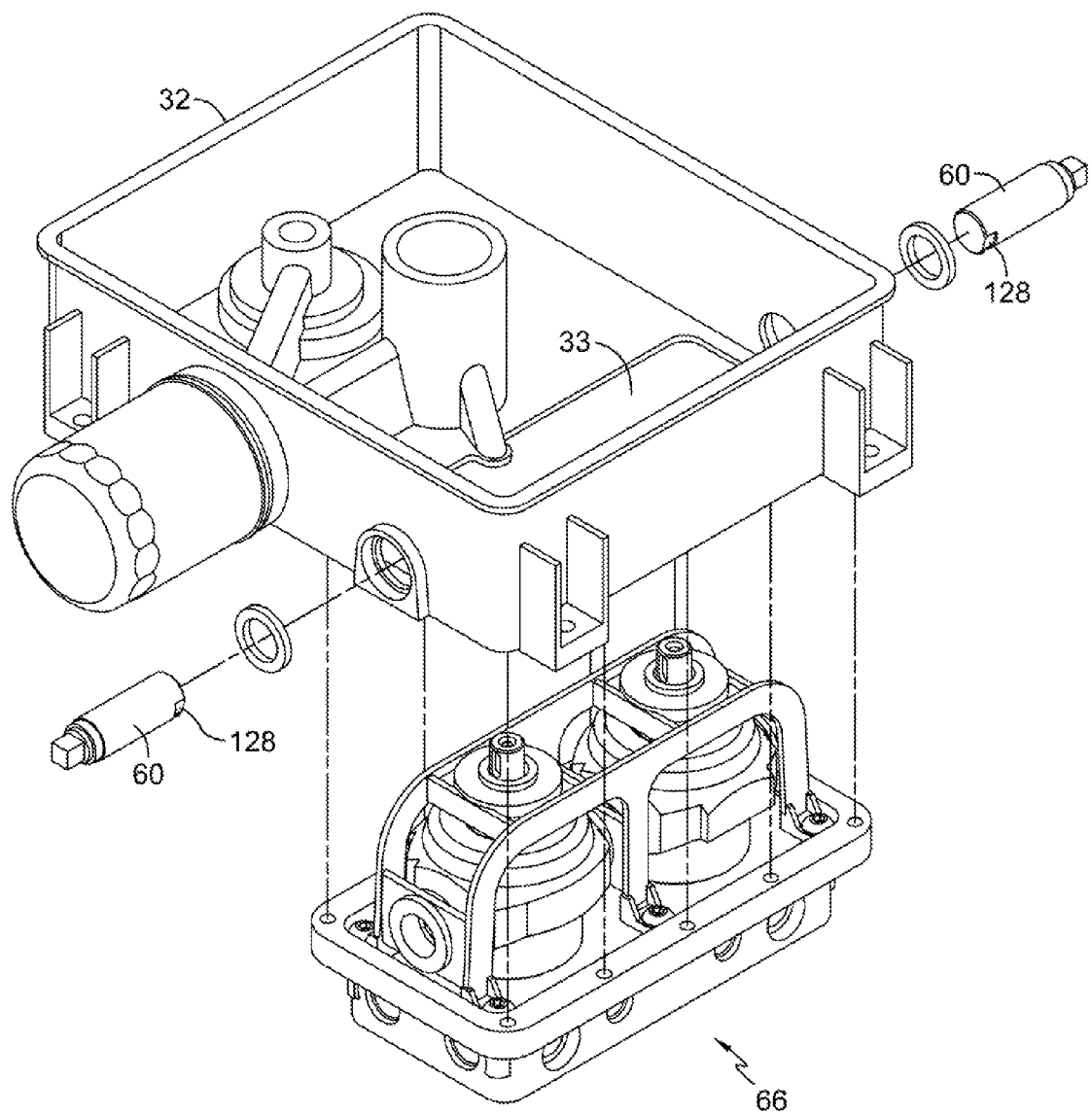
FIG. 7 is a perspective view of certain elements of the first embodiment of the present invention, with some portions exploded.

Referring to FIGS. 4, 6, 7 and 8, the assembly of the pump portions into lower engine housing 32 will be described. FIG. 7 shows a partially exploded view of the lower engine housing 32 and pump assembly 66. Note that pump assembly 66 may comprise first gear 36 and second gear 38, but these gears have been removed in FIG. 7 in order to show the features that would be otherwise obscured by these gears.

Pump assembly 66 may be assembled into the form shown in FIG. 7, except that first gear 36 and second gear 38 may also be attached thereto prior to assembly, and pump assembly 66 may then be attached to lower engine housing 32. It will be appreciated by those of skill in the art that in this configuration, lower engine housing 32 may be attached to engine assembly 14 before pump assembly 66 is attached to lower engine housing 32, extending at least partially through opening 33 formed in lower engine housing 32, thus providing flexibility in the manufacturing process. This configuration also allows for pump assembly 66 to be removed from the engine without disassembly and removal of lower engine housing 32, thereby improving serviceability. As shown in FIG. 4, first gear 36 and second gear 38 may be small enough that they can be inserted through opening 33 while installed on first pump shaft 44 and second pump shaft 46. In such a configuration, the major diameter $d_o$ of the gears 36 and 38 is smaller than the width w of opening 33, while the maximum distance $d_{max}$ from the edge of first gear 36 to the opposed edge of second gear 38 is less than length l of opening 33. Alternatively, if these gears are not small enough to be inserted through opening 33 while installed on first pump shaft 44 and second pump shaft 46, a pump assembly 66 without gears 36 and 38 could first be installed on lower engine housing 32, and then gears 36 and 38 could be installed on pump assembly 66. The resulting lower engine housing subassembly, including housing 32, could then be attached to upper engine housing 31.

Figure 8:
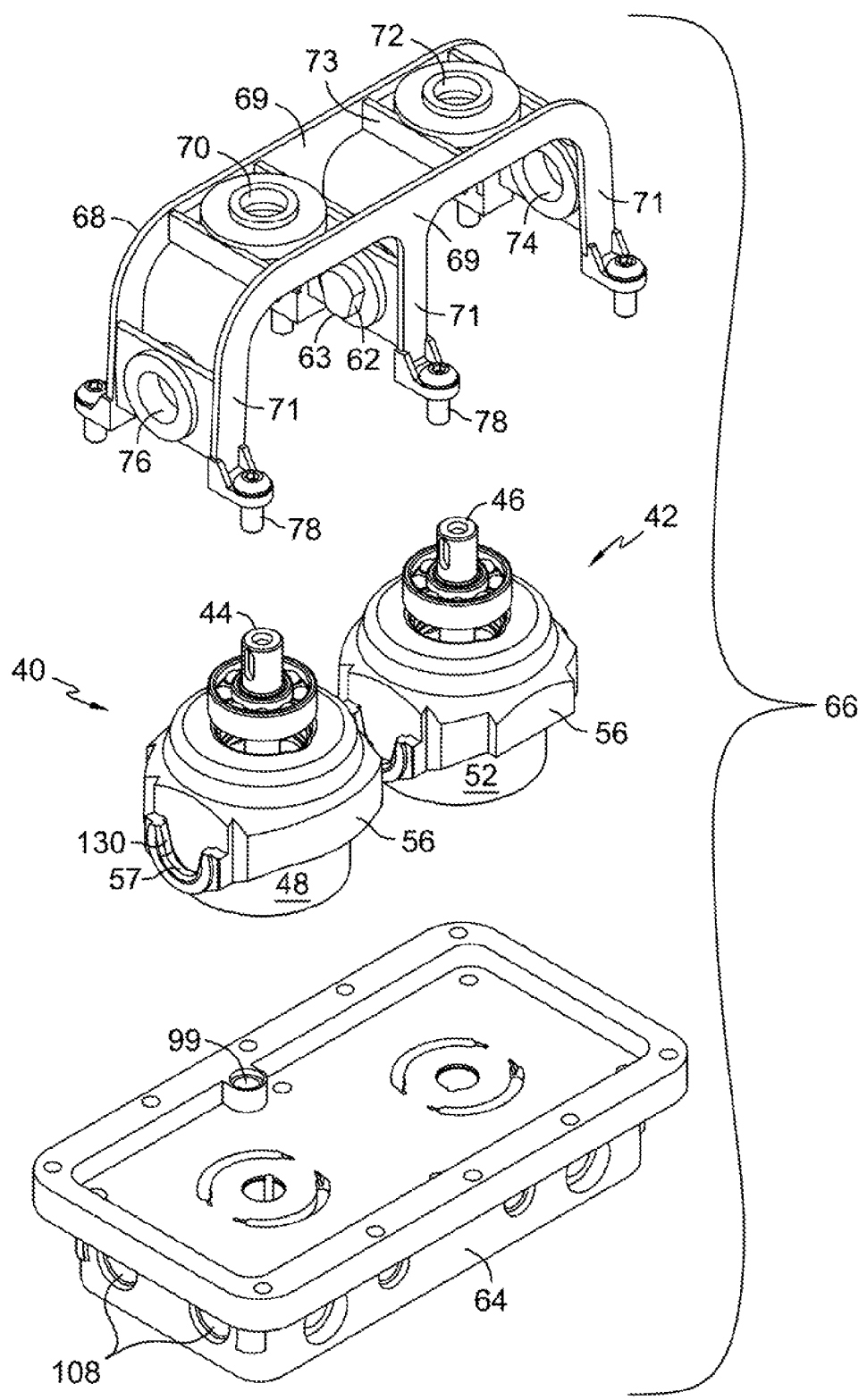
FIG. 8 is an exploded perspective view of certain elements shown in FIG. 7.

Referring to FIG. 8, pump assembly 66 comprises a number of elements including plate 64, first pump 40, second pump 42 and pump support 68. Bearing supports 70 and 72 receive pump shafts 44 and 46, respectively. Bearing supports 70 and 72 and trunnion supports 74 and 76 may be located on pump support 68 and may be integrally formed thereon or may be mounted to the pump support separately. Trunnion supports 74 and 76 are sized to receive trunnions 60. Pivot support 62, which supports one side of each swash plate body 56 as body 56 is rotated by a trunnion 60, may also be integrally formed on pump support 68 or attached as separate components.

As shown, pump support 68 is comprised of a pair of parallel arches 69 having multiple legs 71. Arches 69 are joined by a plurality of cross members 73. Pump support 68 is attached to support plate 64 via fasteners 78, which may optionally be pre-positioned and retained on pump support 68 for ease of assembly. Staking or other known methods of retention may be used to accomplish this pre-positioning. Attachment of pump support 68 to support plate 64 retains first pump 40 and second pump 42 against support plate 64. Pump support 68 further retains swash plate bodies 56 as part of pump assembly 66. Pump assembly 66 may comprise additional elements not shown in FIG. 8, such as first gear 36, second gear 38 and fasteners or other elements to attach these gears to shafts 44 and 46.

Referring especially to FIGS. 6 and 8, swash plate bodies 56 may include grooved curve portions 57 which engage with a mating feature on trunnion 60 on one side of body 56 and retain trunnion 60 to swash plate body 56, limiting movement of trunnion 60 along its axis. On the other side of body 56, grooved curve portions 57 engage curved portions 63 on pivot supports 62 of pump support 68. The grooved curved portions on the opposite sides of swash plate body 56 are preferably symmetrically identical, thereby preventing incorrect installation at assembly and eliminating the need to maintain separate inventories of right hand and left hand parts.

As previously described, pump assembly 66 is configured to be preassembled and installed into lower engine housing 32. The subsequent installation of trunnions 60 through lower engine housing 32 into swash plate body 56 is achieved through the novel design shown in FIGS. 12-16.

Figure 14:
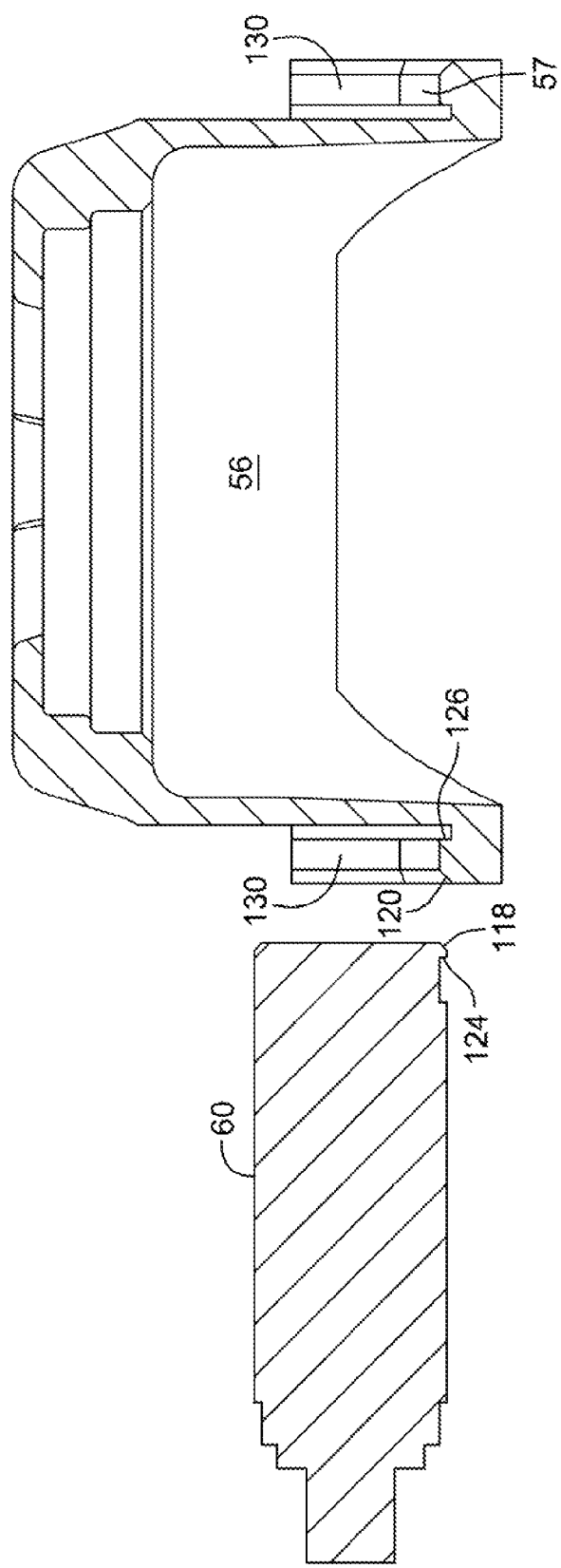
FIG. 14 is a cross-sectional view along the line 14-14 of FIG. 13.

As shown in, e.g., FIG. 14, each trunnion 60 is provided with a ramp 118, which covers only an arcuate portion of the circumference of trunnion 60. When trunnion 60 is inserted into lower engine housing 32 and swash plate body 56, ramp 118 contacts a ramp 120 formed in swash plate body 56. The engagement of ramp 118 with ramp 120 pushes swash plate body 56 against the action of piston springs 122 (see FIG. 6). After edge 124, formed on trunnion 60, clears edge 126, formed on swash plate body 56, swash plate body 56 will return to its original position by the action of springs 122, retaining trunnion 60 as shown in FIG. 16.

Figure 17:
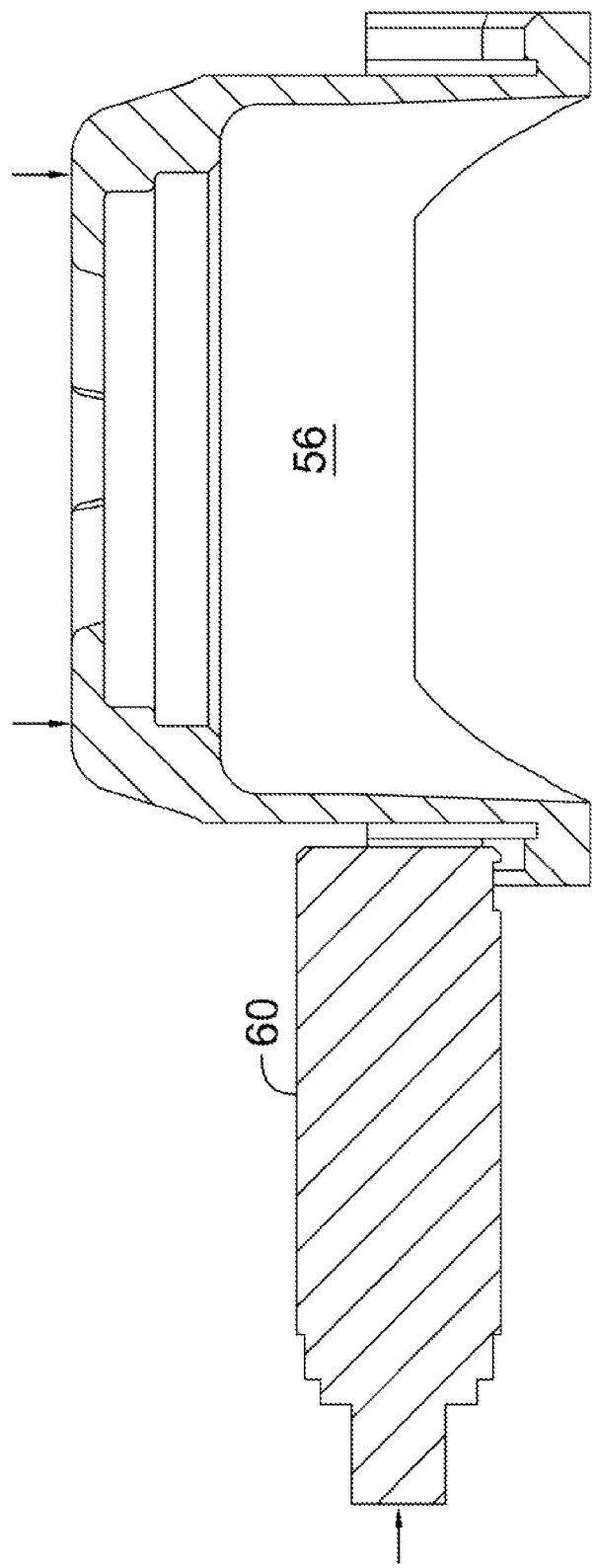
FIG. 17 is a cross-sectional view similar to that of FIG. 14, showing one method of attaching the trunnion to the swash plate body.

Alternatively, swash plate body 56 may be pushed downward in the direction of the arrows shown in FIG. 17 so that trunnion 60 can be inserted through lower engine housing 32 into engagement with swash plate body 56. Swash plate body 56 is then released to engage trunnion 60. In either of these configurations, the form on the end of trunnion 60 and the engagement of that form with a mating form on swash plate body 56 in combination with the action of piston springs 122 causes trunnion 60 to be retained in lower engine housing 32.

As shown in FIG. 7, trunnions 60 also comprise trunnion flats 128 located at ends of the trunnions. Trunnion flats 128 mate with swash plate body flats 130 formed on swash plate body 56, as shown in FIG. 14. The engagement of trunnion flats 128 with swash plate body flats 130 enable the rotation of trunnion 60 to be transmitted to swash plate body 56.

Figure 5:
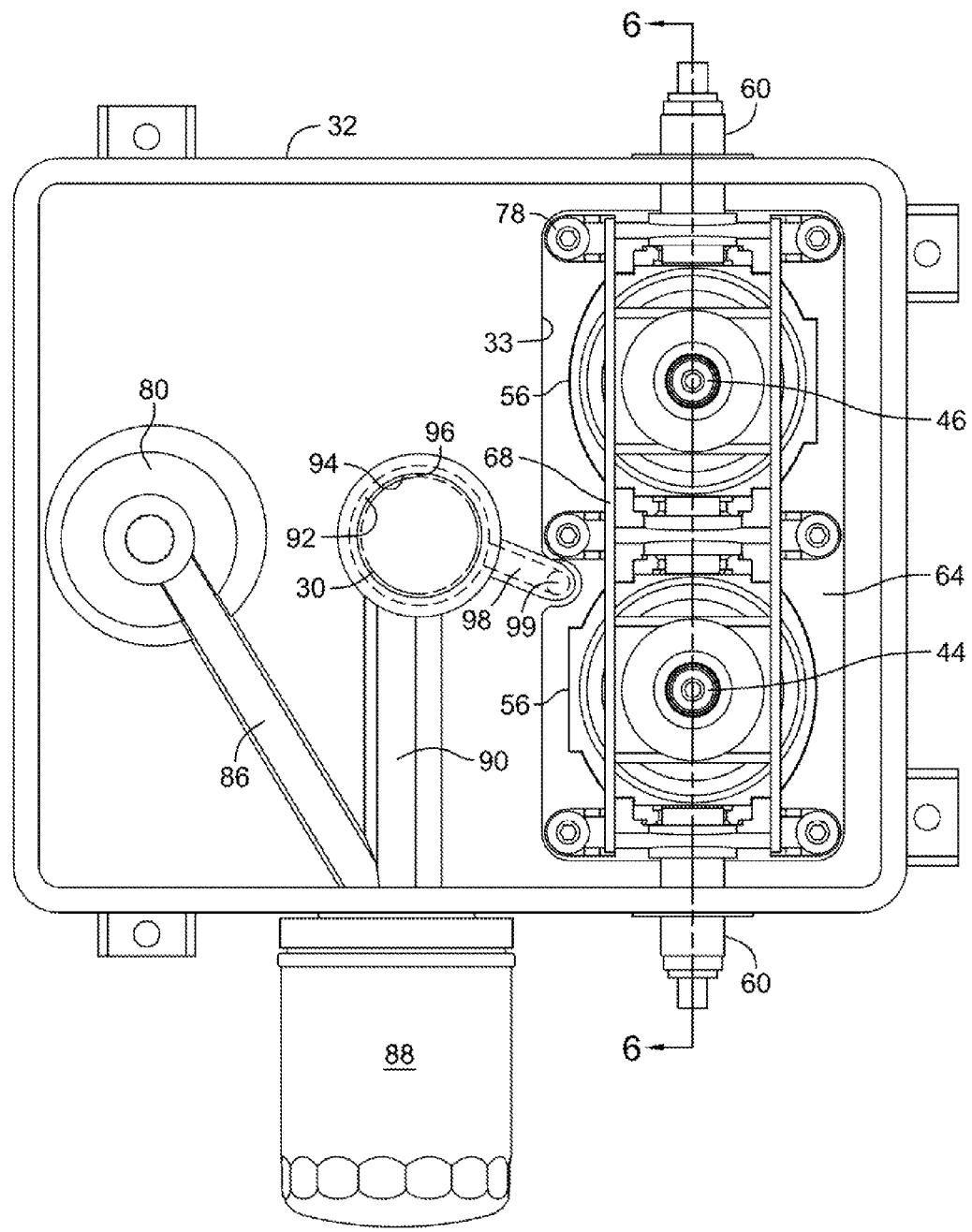
FIG. 5 is a plan view of certain elements of the first embodiment of the present invention with gears removed from the pump shafts for clarity.
Figure 9:
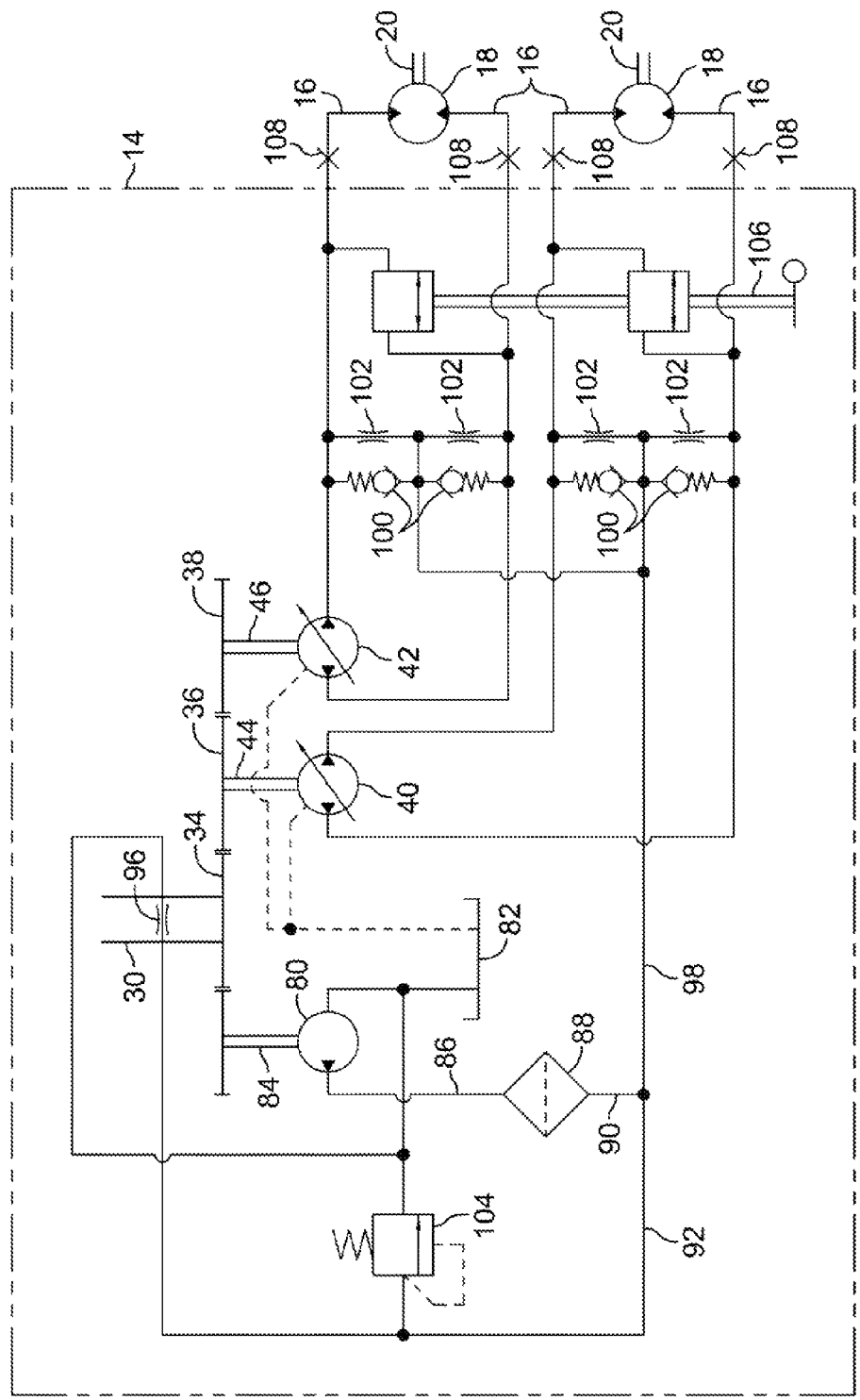
FIG. 9 is an exemplary schematic of certain features of the first embodiment.

As shown in FIGS. 4, 5 and 9, pump assembly 66 may be located within the same sump as engine assembly 14 and may share the same oil used to lubricate engine assembly 14. For example, the configuration described below provides for fluid replenishment to first pump 40 and second pump 42.

Referring now to FIGS. 4, 5, and 9, the replenishment fluid circuit will be described. A charging pump 80 may be located in a pocket formed in lower engine housing 32. Charging pump 80 may be driven by cam shaft 30 of engine assembly 14. Charging pump 80 pulls fluid from sump 82 of engine assembly 14, which is formed by lower engine housing 32. Charging pump 80 sends pressurized fluid through first passage 86 to filter 88. The pressurized fluid then flows through second passage 90 to annular crankshaft boss passage 92 formed in crankshaft support boss 94. The pressurized fluid in crankshaft boss passage 92 provides a fluid bearing for crankshaft 30, leaking through the annular gap 96 (as shown in FIG. 5) between crankshaft 30 and crankshaft boss 94, returning to sump 82.

Pressurized fluid also travels from crankshaft boss passage 92 through a third passage 98 into opening 99 in support plate 64 (as shown, e.g., in FIG. 8). Once inside support plate 64, pressurized fluid is distributed to check valves 100 and may be distributed to one or more bleed orifices 102. As shown schematically in FIG. 9, a pressure relief valve 104 may be provided to direct excess pressurized fluid back to sump 82 or into the inlet of charging pump 80.

The fluid circuit shown in FIG. 9 may include additional features. For example, a bypass configuration 106 may be incorporated. Bypass configuration 106 may have two valves controlled by one actuator, as shown in FIG. 9, or two independently controlled valves. FIG. 9 also shows ports 108 connecting to hydraulic lines 16 that lead to hydraulic motors 18. FIG. 9 also schematically depicts an alternative gear arrangement in which gear 34 drives gear 36 which drives gear 38. In the gear arrangement shown in FIGS. 3 and 4, gear 34 drives both gears 36 and 38 simultaneously.

Figure 10:
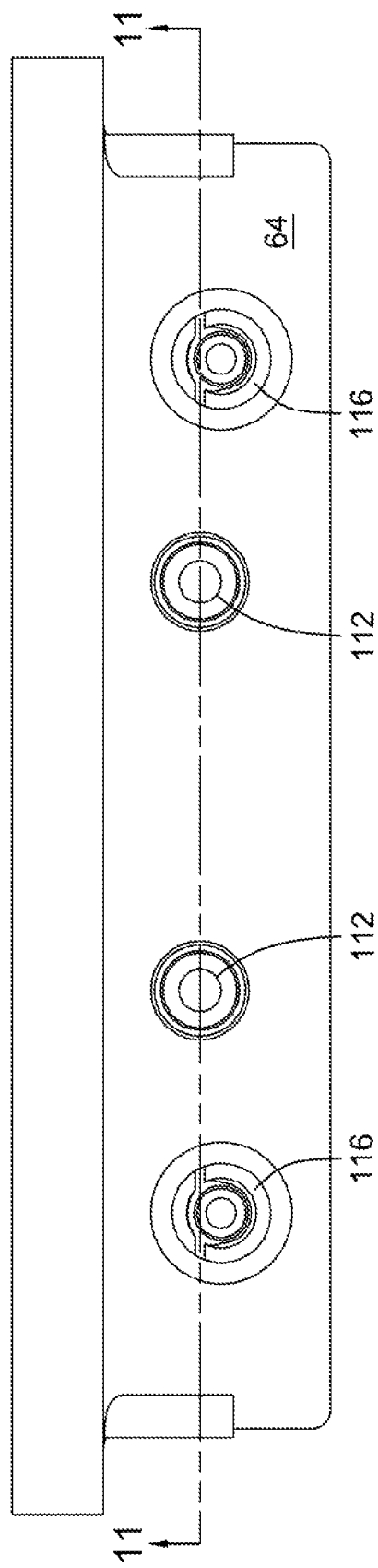
FIG. 10 is an elevational view of an exemplary end cap of the present invention.
Figure 11:
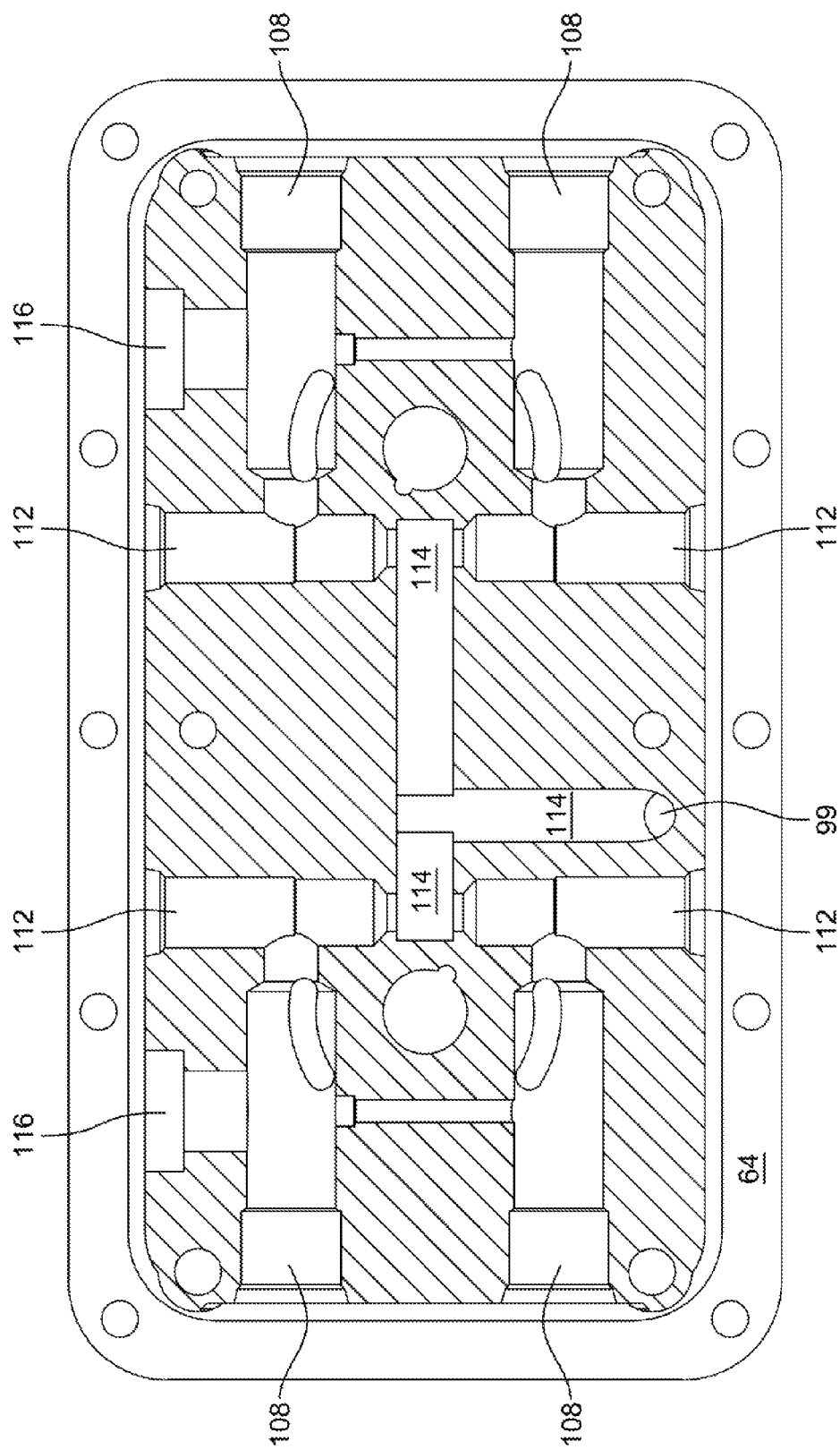
FIG. 11 is a cross-sectional view along the line 11-11 of FIG. 10.
Figure 12:
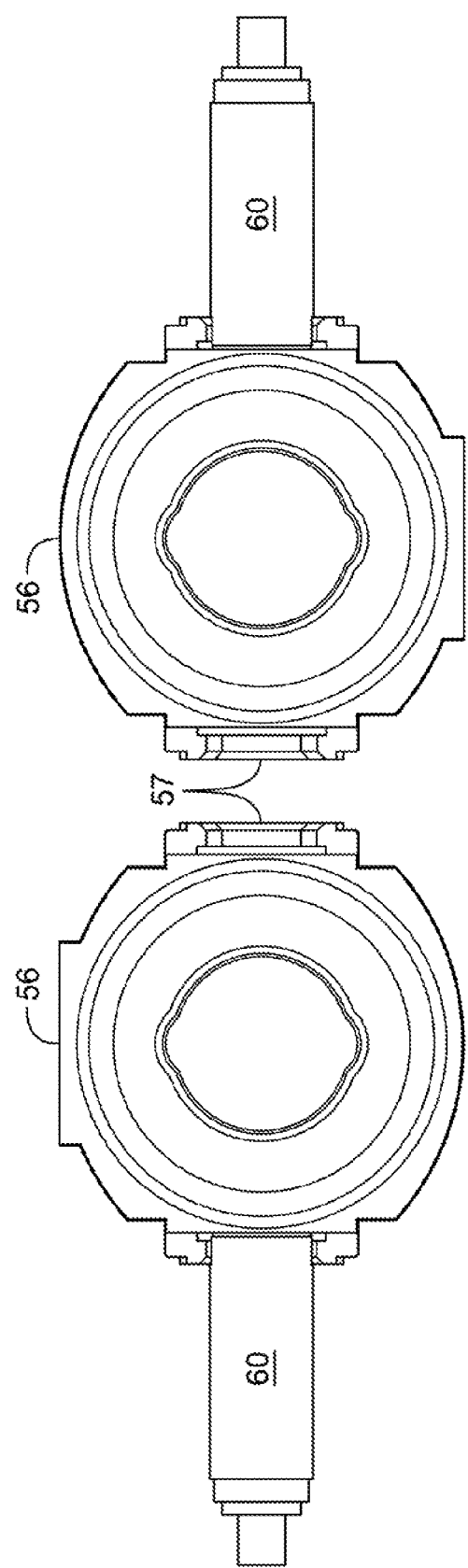
FIG. 12 is a plan view of a pair of swash plates and one trunnion attached to each swash plate in accordance with the present invention.
Figure 13:
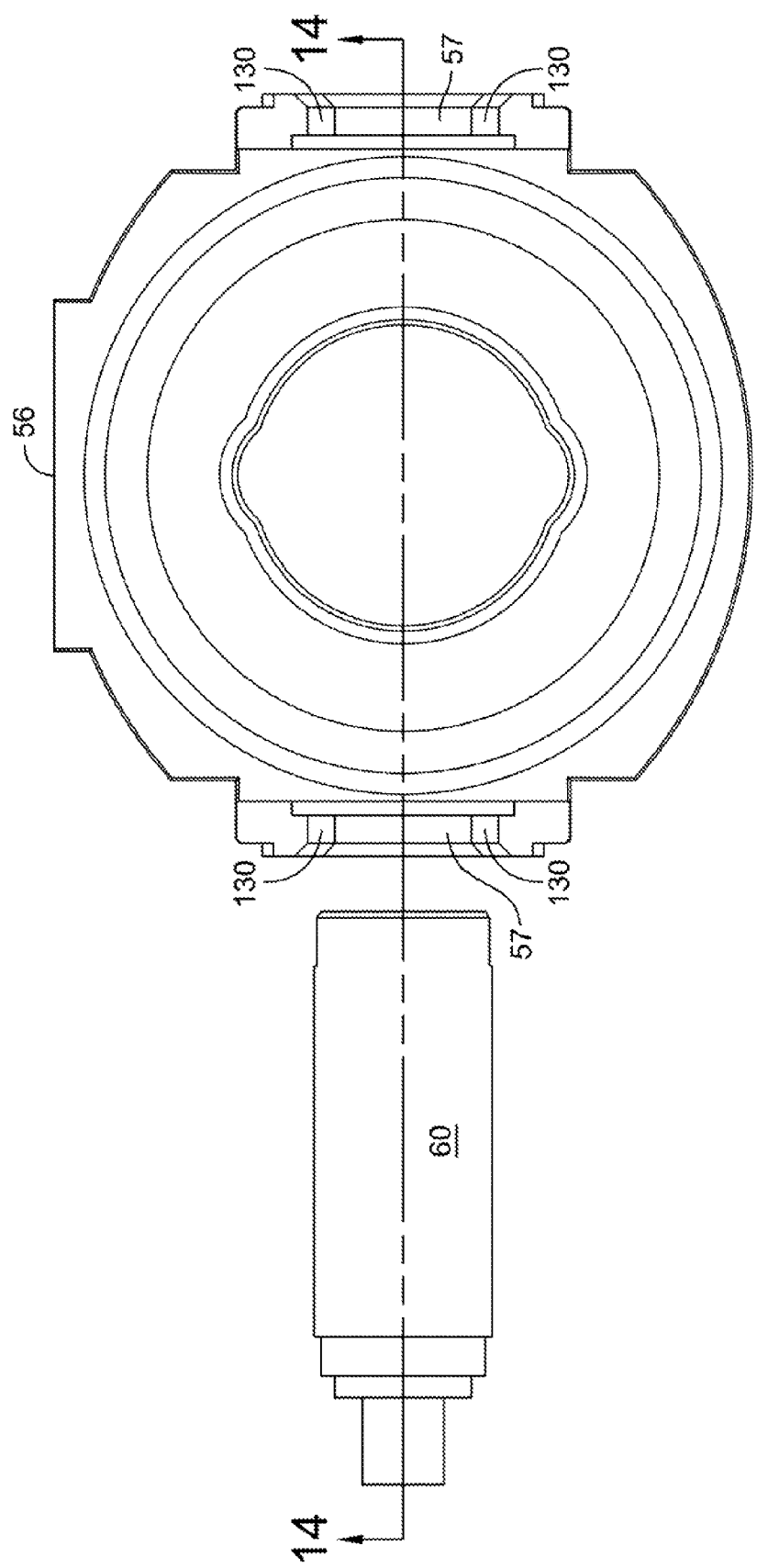
FIG. 13 is a plan view of one of the swash plates shown in FIG. 12, with the respective trunnion removed from the swash plate.

FIGS. 10 and 11 show views of support plate 64 including an arrangement of the hydraulic porting contained therein. Support plate 64 may include a plurality of ports and passages to house the elements previously described. For example, ports 112 may locate check valves 100 and ports 116 may each locate a portion of bypass configuration 106. As shown in FIG. 11, opening 99 and passages 114 connect third passage 98 to ports 112.

Figure 18:
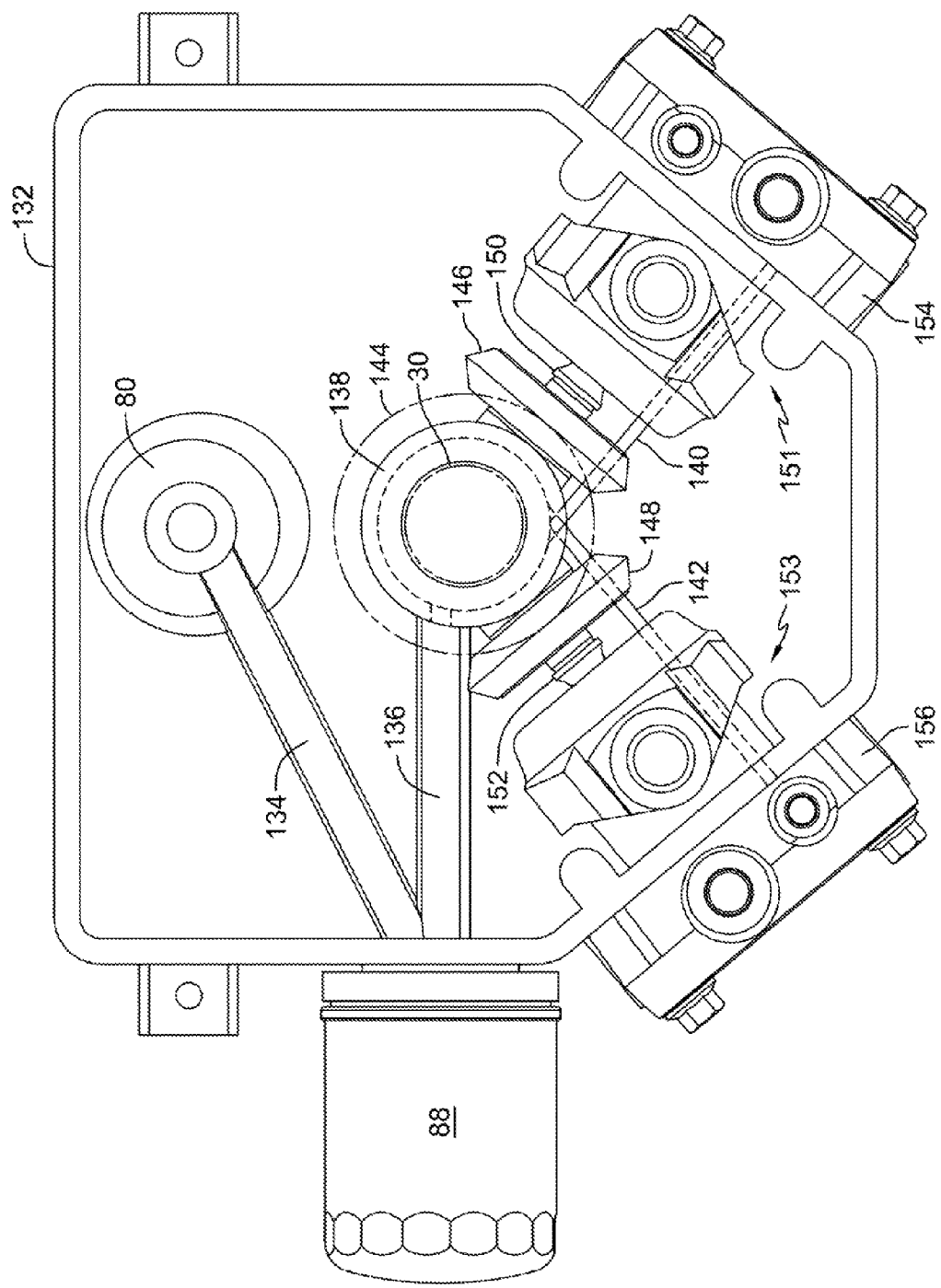
FIG. 18 is a plan view of certain elements of a second embodiment of the present invention.

FIG. 18 shows a second embodiment of a pump configuration. In this embodiment, lower engine housing 132 provides locations for charging pump 80, filter 88 and passages 134, 136 and 138 for flow of pressurized fluid. Tubes 140 and 142 connect crankshaft boss passage 138 to first support plate 154 and second support plate 156, which serve as running surfaces for first pump 151 and second pump 153, respectively. First and second support plates 154 and 156 are attached to openings in the sidewall of lower engine housing 132.

In this embodiment, a bevel gear 144 is driven by crankshaft 30. Bevel gear 144 drivingly mates with first bevel gear 146 and second bevel gear 148, which then drive first pump shaft 150 and second pump shaft 152, respectively. First support plate 154 and second support plate 156 contain porting similar to the porting previously described in connection with support plate 64. In this configuration, the axes of rotation of the pumps 150 and 152 are generally perpendicular to the rotational axis of crankshaft 30. As shown in FIG. 18 first support plate 154 and second support plate 156 may be positioned at an angle that is not 90 degrees with respect to one another. However, an array of angles is possible depending on the size of lower engine housing 132 and the components located in lower engine housing 132.

Figure 19:
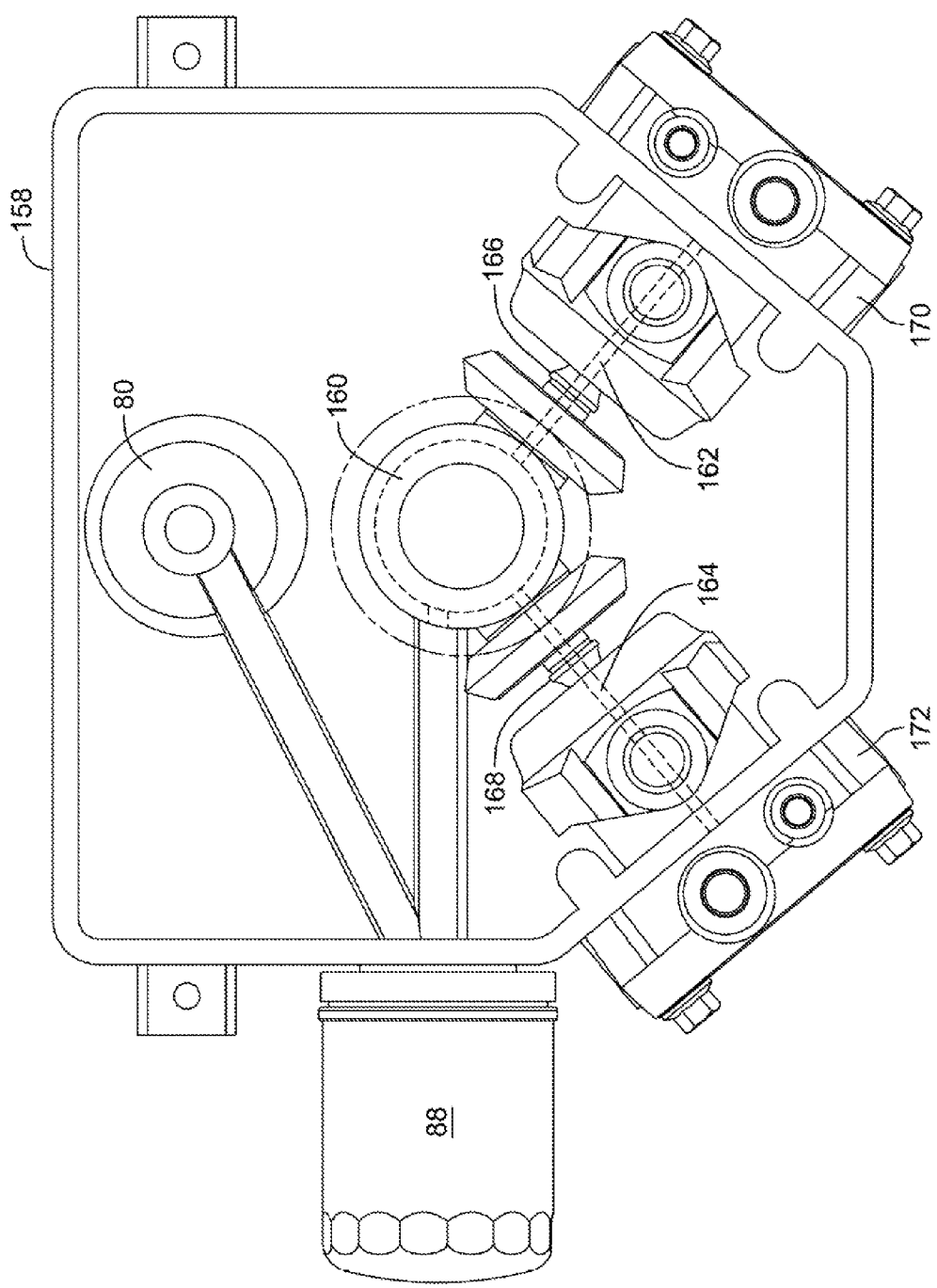
FIG. 19 is a plan view of certain elements of a third embodiment of the present invention.
Figure 20:
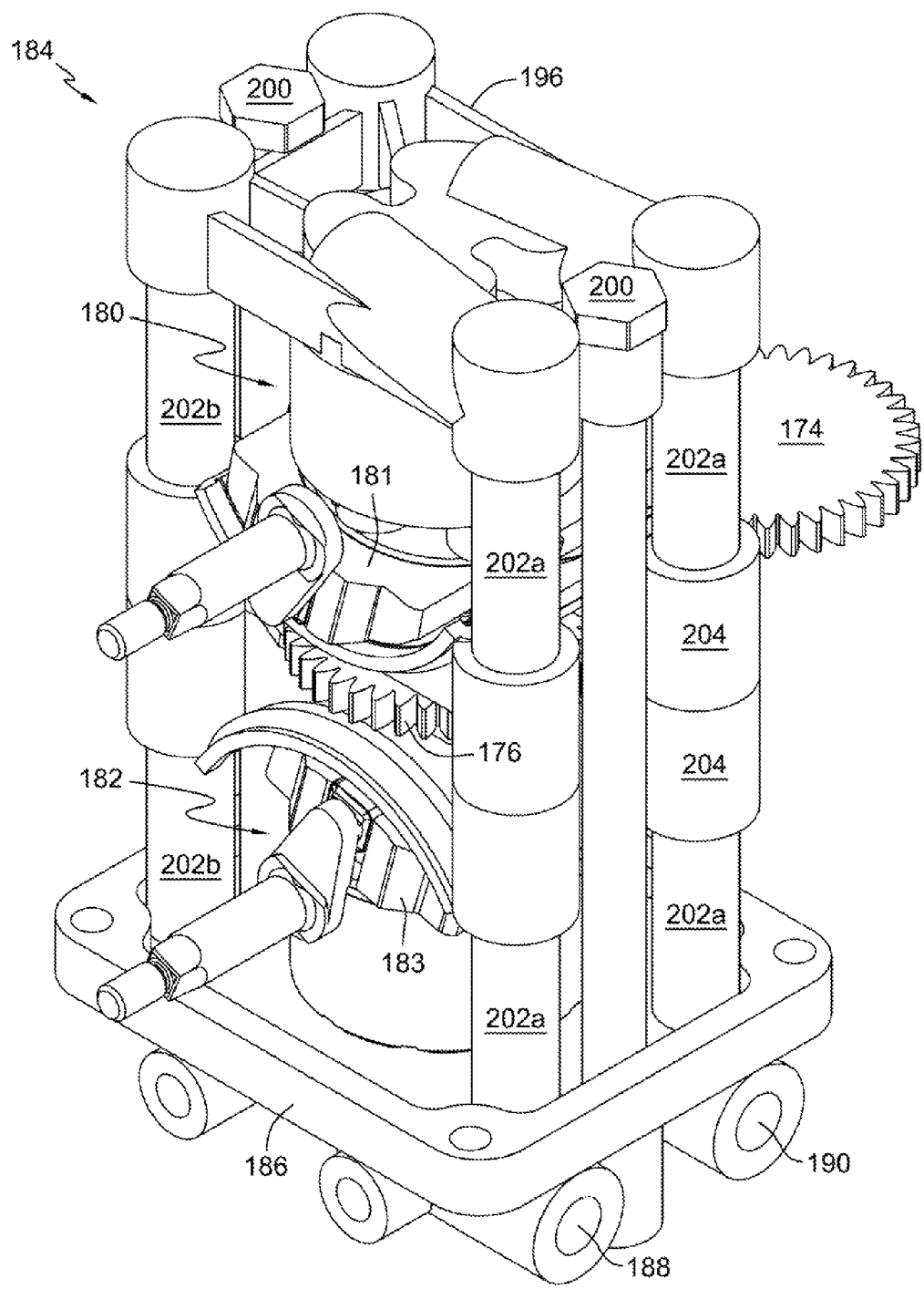
FIG. 20 is a perspective view of a fourth embodiment of the present invention.
Figure 21:
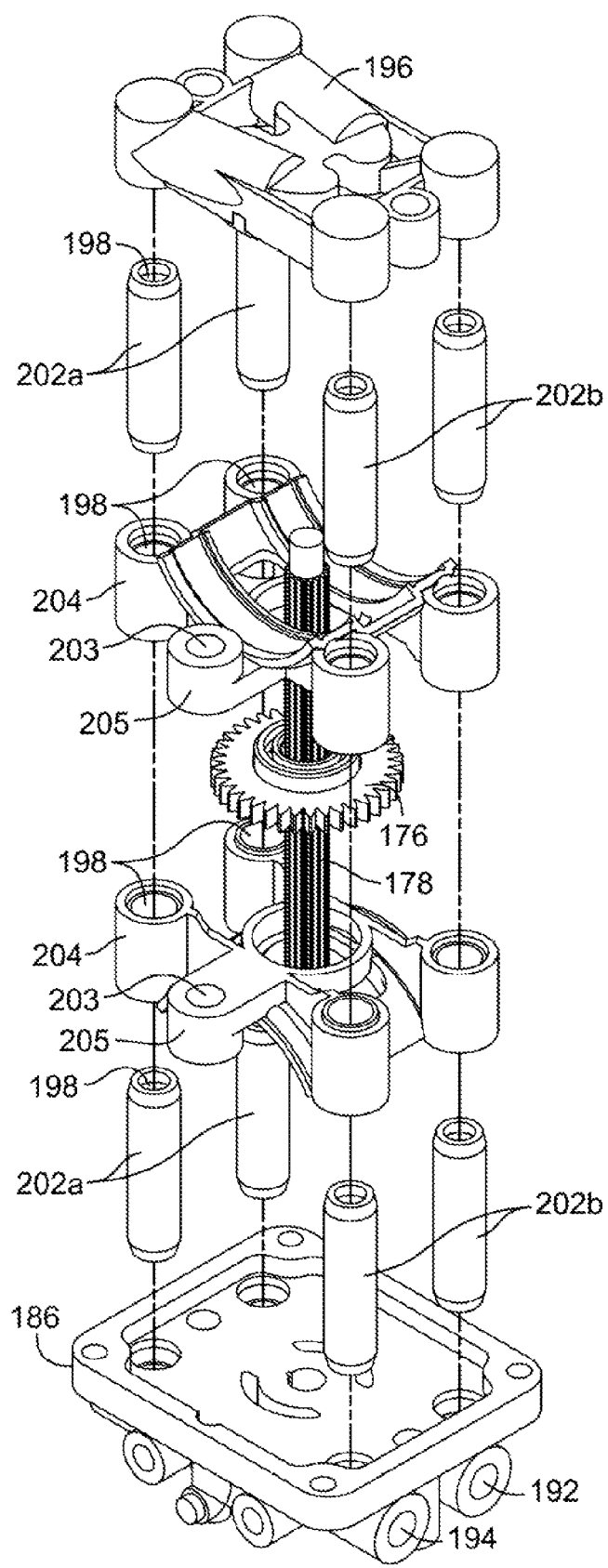
FIG. 21 is an exploded view of certain elements of the fourth embodiment of the present invention.
Figure 22:
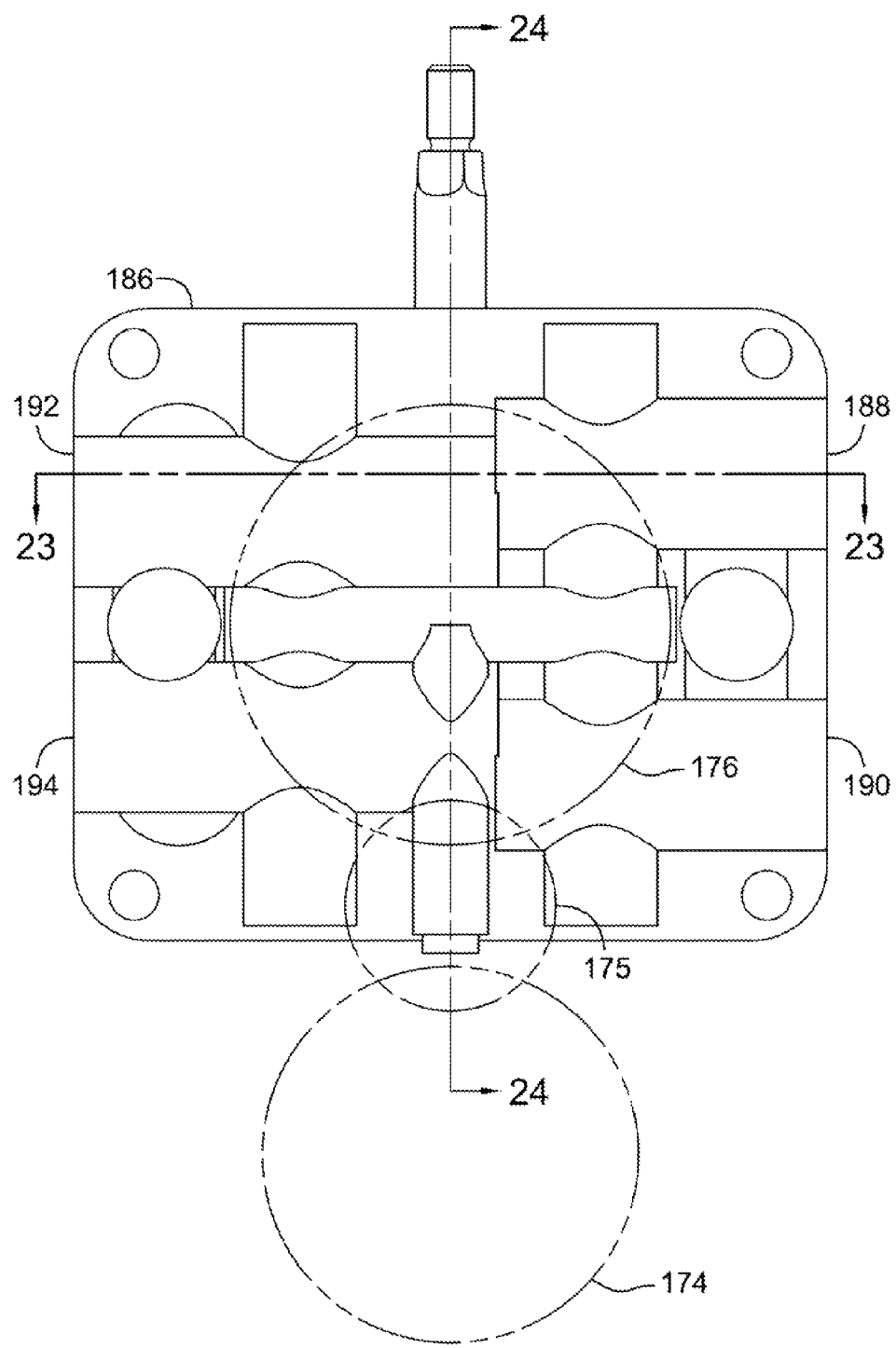
FIG. 22 is a plan view of certain elements of the fourth embodiment.

A third embodiment is shown in FIG. 19. In this embodiment, which is similar to that shown in FIG. 18, the connections between annular passage 160 and first support plate 170 and second support plate 172 are passages 162 and 164, formed in first pump shaft 166 and second pump shaft 168, respectively. These elements are supported directly or indirectly in lower engine housing 158 in a similar manner as the embodiment in FIG. 18.

FIGS. 20 to 24 depict a fourth embodiment pump assembly 184 of the present invention. In this embodiment, crankshaft gear 174 drives a pump shaft gear 176 located on pump shaft 178. A pump shaft 178 is common to and drives both a first pump 180 and a second pump 182. A lower support plate 186 is located external to the lower engine housing of this embodiment (not shown).

Pump assembly 184 comprises: upper support plate 196, first and second pumps 180 and 182 having first and second swash plates 181 and 183, respectively, a plurality of tubes 202a and 202b, cradle bearing supports 204, and lower support plate 186. Ports 188, 190, 192 and 194, located in lower support plate 186 provide for hydraulic connections from lower support plate 186 to the separate hydraulic motors (not shown in this embodiment). In the embodiment shown, ports 188 and 190 are both located on a first side of lower support plate 186. Tubes 202a are hollow and cradle bearing supports 204 have openings passing therethrough. The assembly of tubes 202a to cradle bearing supports 204 creates hydraulic passages 198 connecting ports 188 and 190 to pump 180. As shown most clearly in FIG. 23, passages 198 connect ports 188 and 190 in support plate 186 to passages 197 in upper support plate 196. Passages 197 in upper support plate 196 are connected hydraulically to pump 180. Ports 192 and 194 are connected hydraulically to pump 182 by way of passages formed in support plate 186.

A second set of tubes 202b may be used to provide additional structural support to the assembly 184. As shown, a second set of tubes 202b are connected to cradle bearing supports 204 opposite passages 198. However, in this embodiment, the second set of tubes does not connect to passages in the upper support plate 196 or lower support plate 186.

Figure 23:
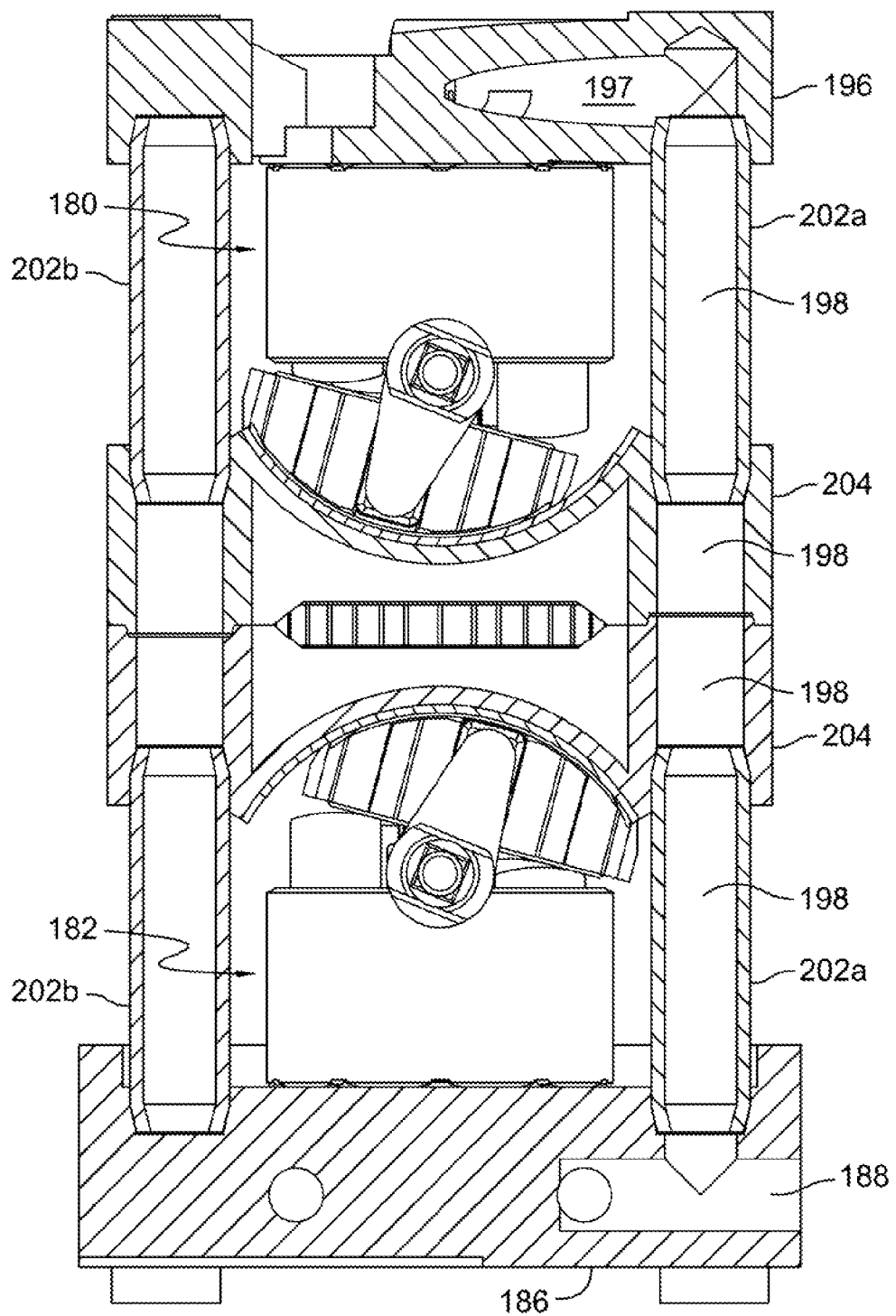
FIG. 23 is a partially sectioned view of the fourth embodiment along the line 23-23 in FIG. 22.
Figure 24:
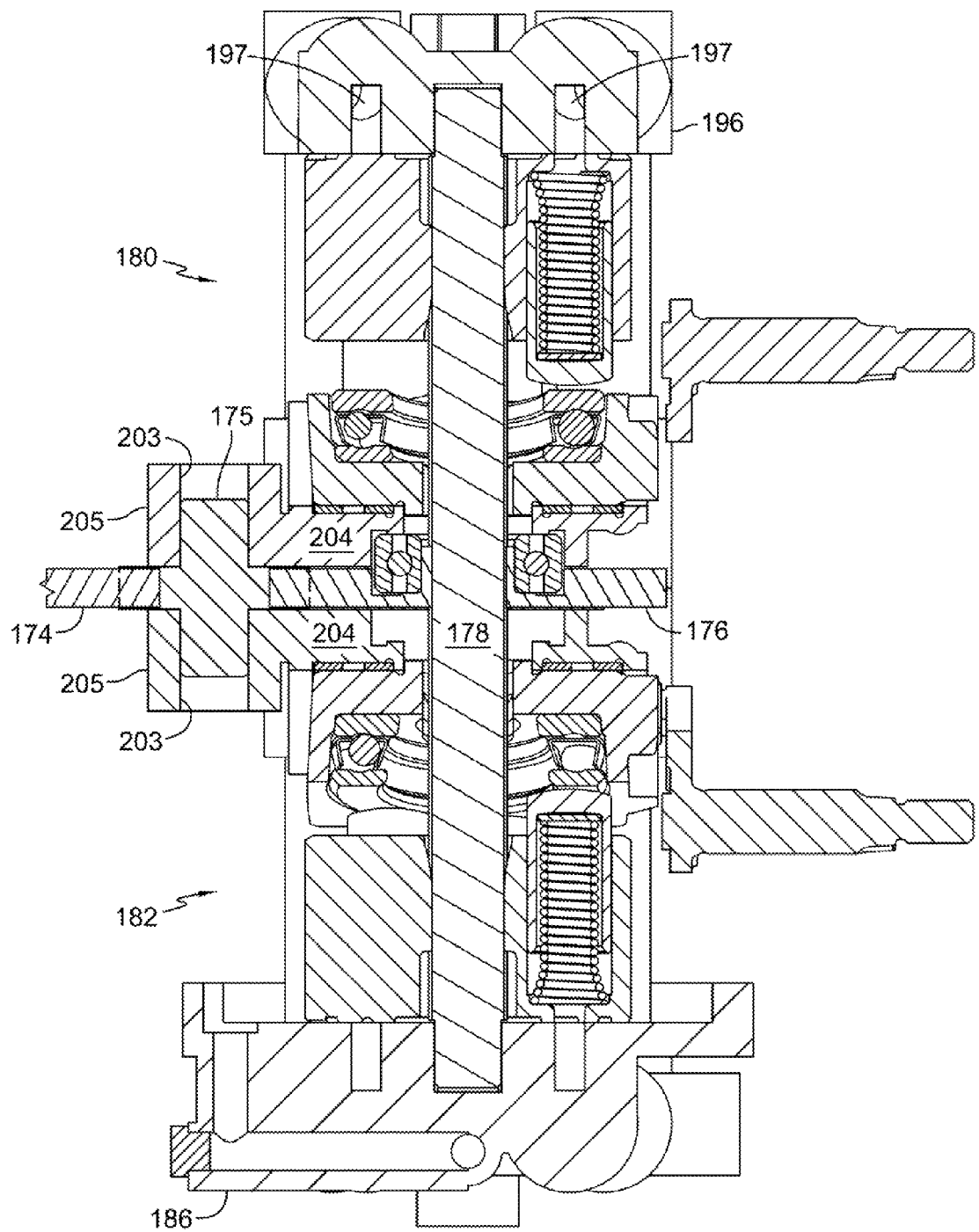
FIG. 24 is a cross-sectional view of the fourth embodiment along the line 24-24 in FIG. 22.

As shown in FIG. 23, the ends of tubes 202a and 202b may be inwardly tapered and sized to fit into outwardly tapered receiving portions of cradle bearing supports 204 and upper and lower support plates 196 and 186. Fasteners 200 pass through openings in the upper and lower support plates 196 and 186, which then compressively retain the plurality of tubes 202a and 202b, cradle bearing supports 204, shaft 178 and gear 176 therebetween. As shown in FIG. 24, optionally, if gear reduction is needed, reduction gear support portions 205 may be formed on cradle bearing supports 204 to capture reduction gear 175 in openings 203 when pump assembly 184 is assembled.

Figure 25:
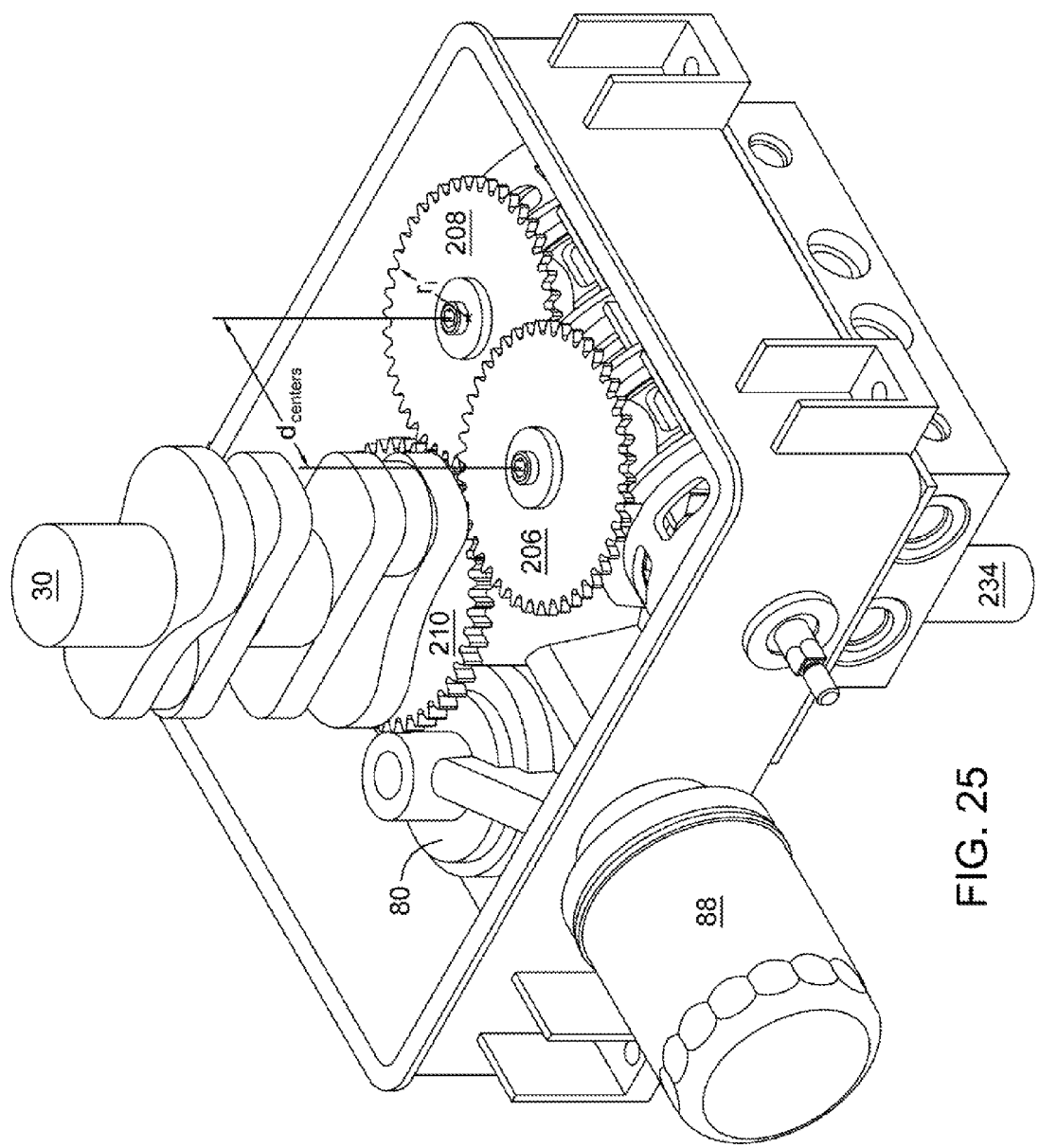
FIG. 25 is a perspective view of a fifth embodiment of the present invention.
Figure 26:
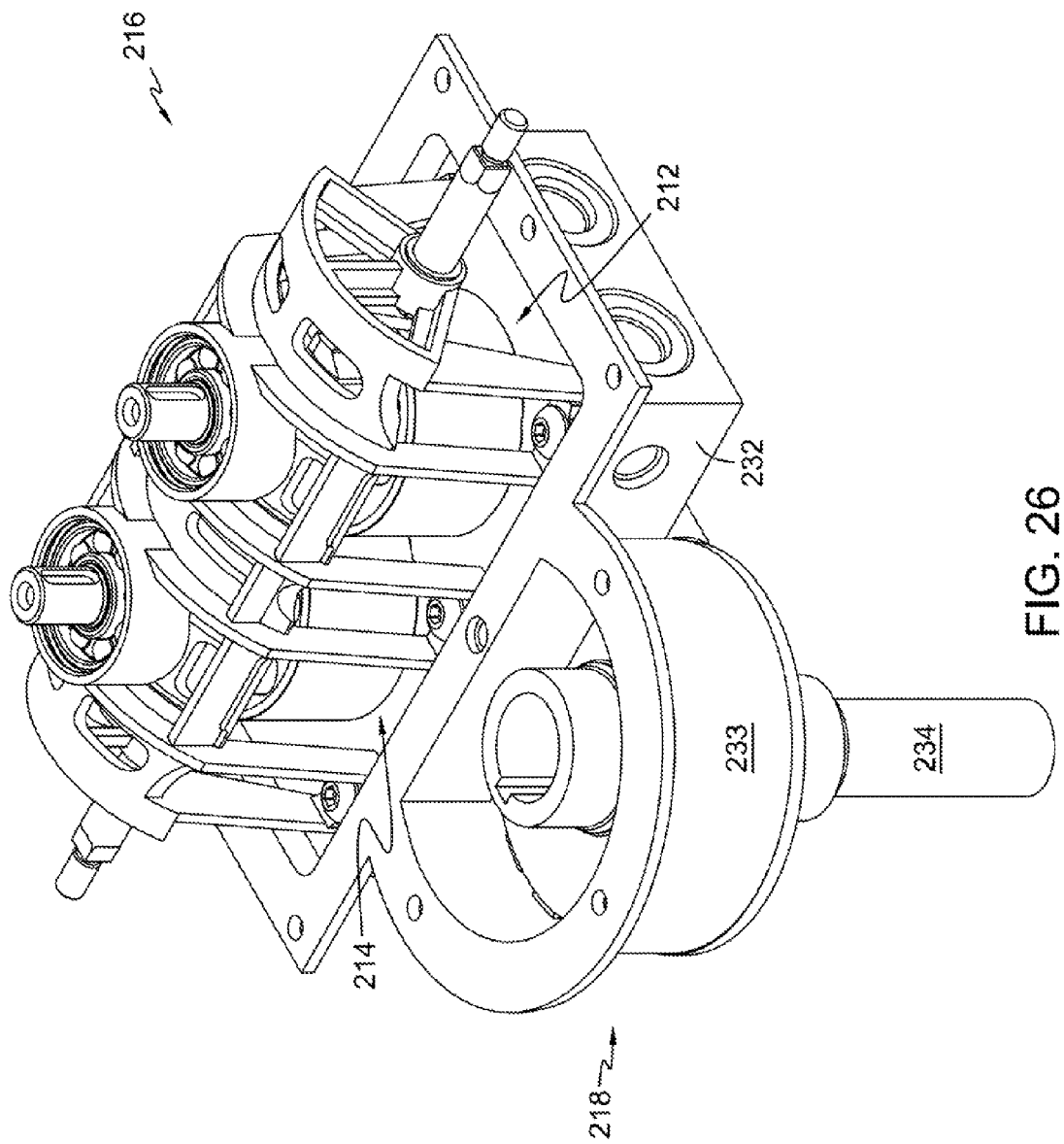
FIG. 26 is a perspective view of certain elements of the fifth embodiment of the present invention.
Figure 27:
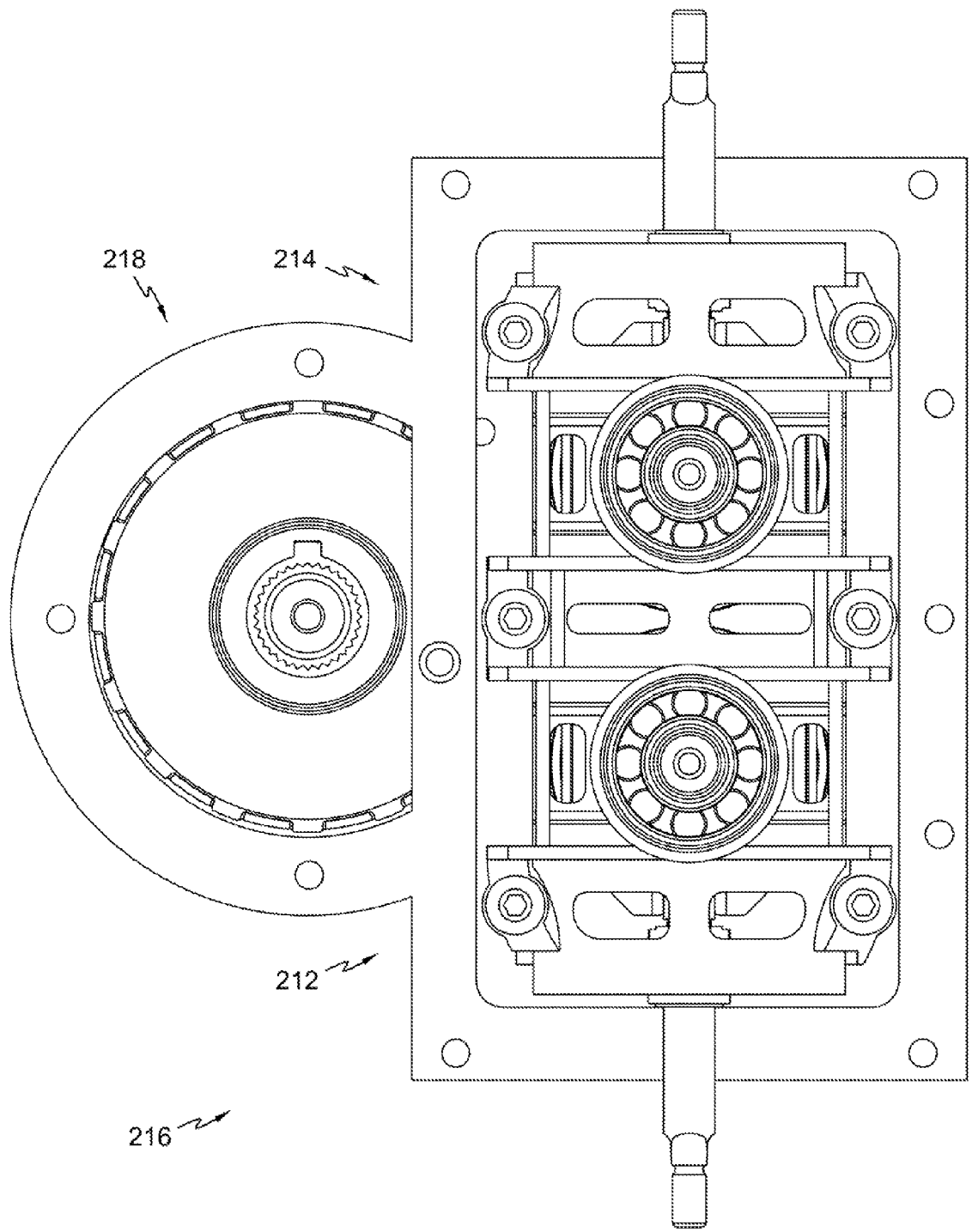
FIG. 27 is a plan view of certain elements of the fifth embodiment of the present invention.
Figure 28:
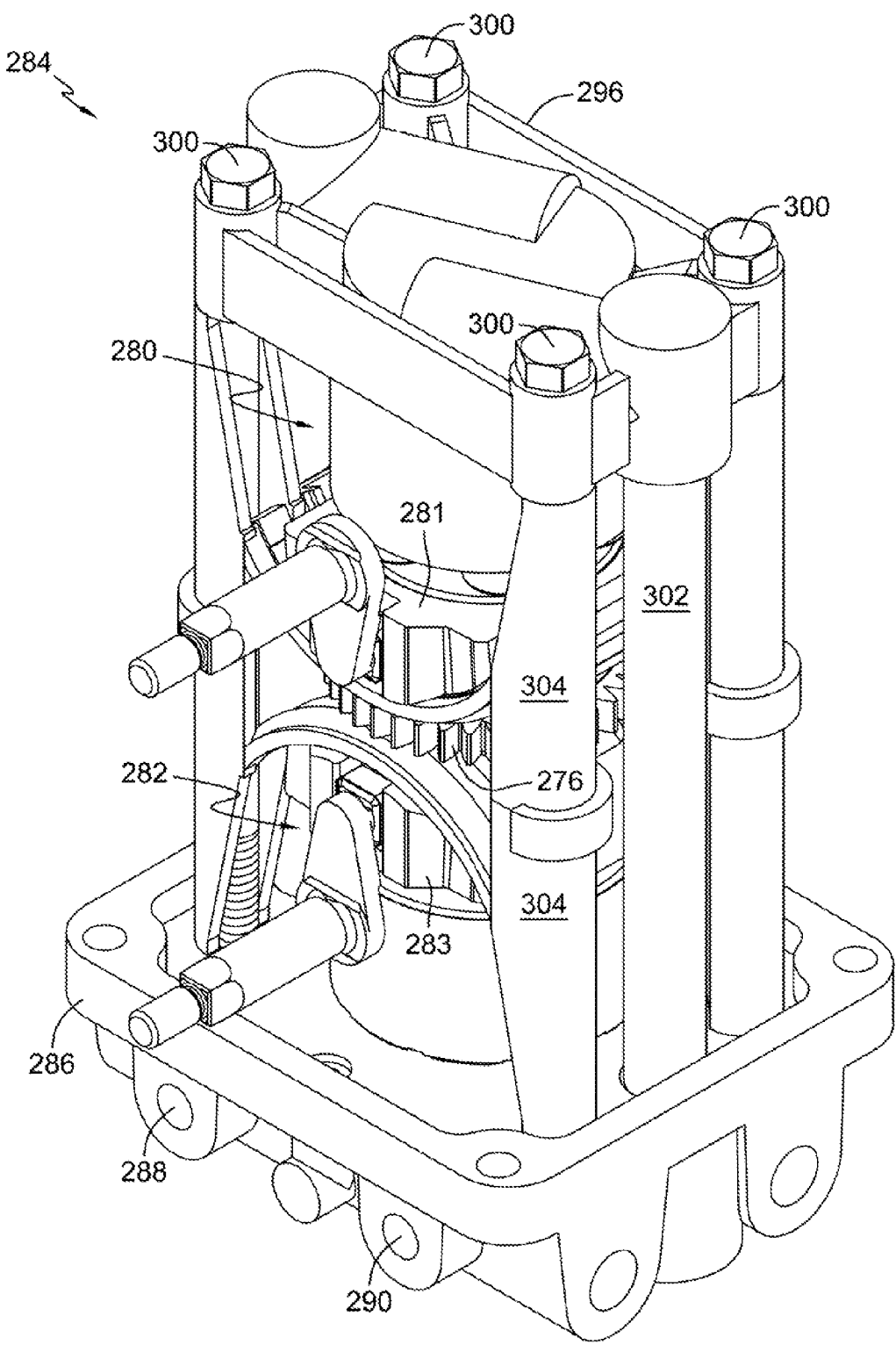
FIG. 28 is a perspective view of a sixth embodiment of the present invention.

FIGS. 25-27 depict a fifth embodiment of the present invention. First gear 206 and second gear 208 each have a minor radius $r_i$ measured from the rotational axis of the gear to the base of the teeth on the gear. First gear 206 overlaps second gear 208, such that distance from the rotational axis of the first gear to the rotational axis of the second gear $d_{centers}$ is less than the sum of the minor radii of the first and second gears, thereby minimizing the size of the assembly. Both gears engage gear 210 located on crankshaft 30. First gear 206 drives first pump 212 and second gear 208 drives second pump 214 of pump assembly 216. Pump assembly 216 also includes a power take-off assembly 218. Attached to support plate 232 is a power take-off housing 233, which may be integrally formed with support plate 232 or may be mounted thereto. Power take-off housing 233 rotatably receives power take-off shaft 234. Rotation of power take-off shaft 234 may be actuated by fluid pressure from fluid delivered to the power take-off from charging pump 80. Operation and configuration of power take-off devices is known to those of skill in the art and is not described in detail herein.

FIGS. 28 to 31 depict a sixth embodiment of the pump assembly 284 of the present invention. Similar to the fourth embodiment in FIGS. 20-24, pump shaft 278 is common to and drives first pump 280 and second pump 282. Shaft gear 276 located on pump shaft 278 is driven by a crankshaft gear or other internal gear (not shown). Support plate 286 is located external to the lower engine housing (not shown) of this embodiment.

Pump assembly 284 comprises an upper support plate 296; first and second pumps 280 and 282 having first and second swash plates 281 and 283, respectively; tubes 302; cradle bearing supports 304; and lower support plate 286. Ports 288, 290, 292 and 294, located in lower support plate 286 provide for hydraulic connections from lower support plate 286 to the separate hydraulic motors (not shown in this embodiment). In the embodiment shown, ports 288 and 290 are both located on a first side of lower support plate 286.

Figure 29:
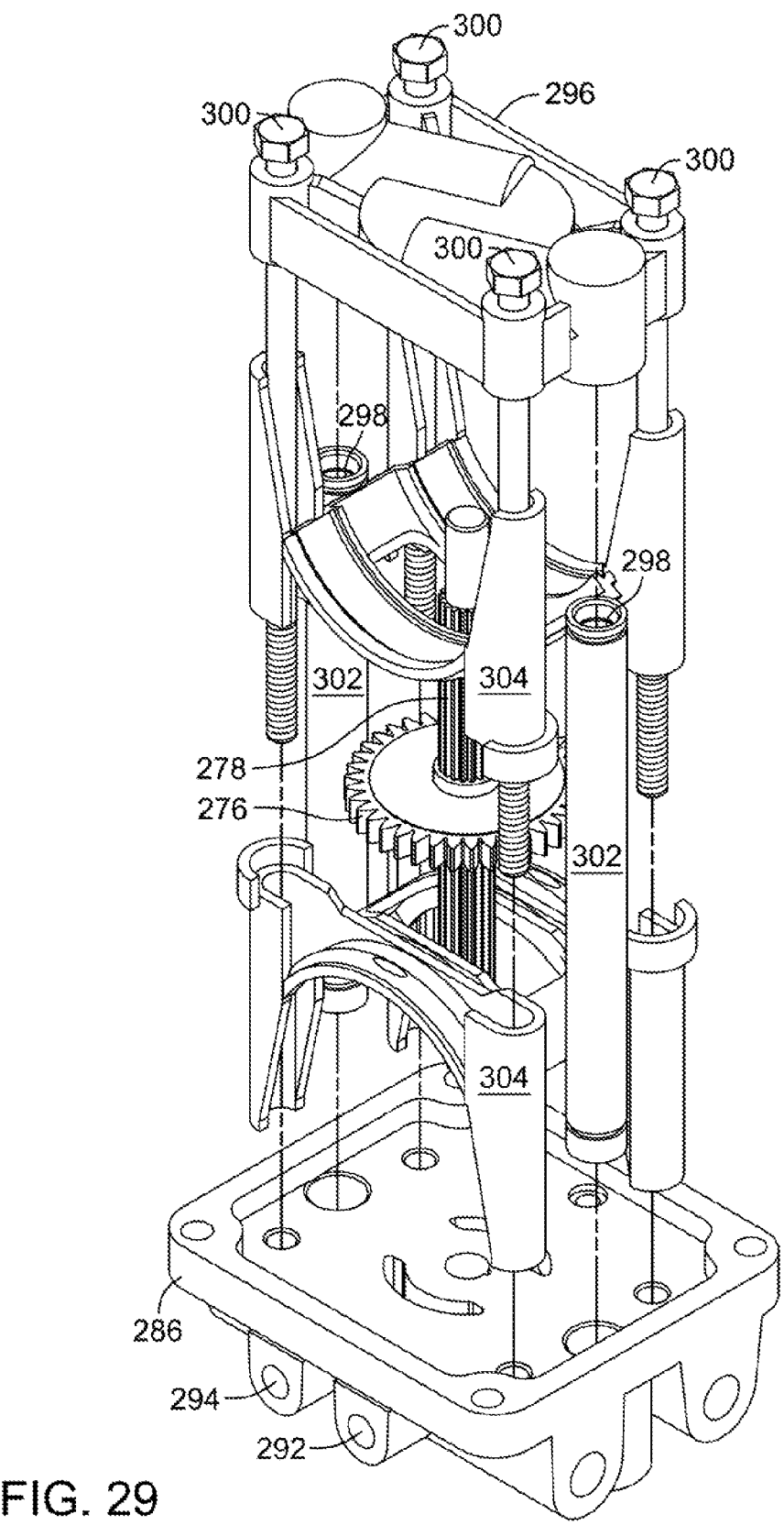
FIG. 29 is an exploded view of certain elements of the sixth embodiment of the present invention.
Figure 30:
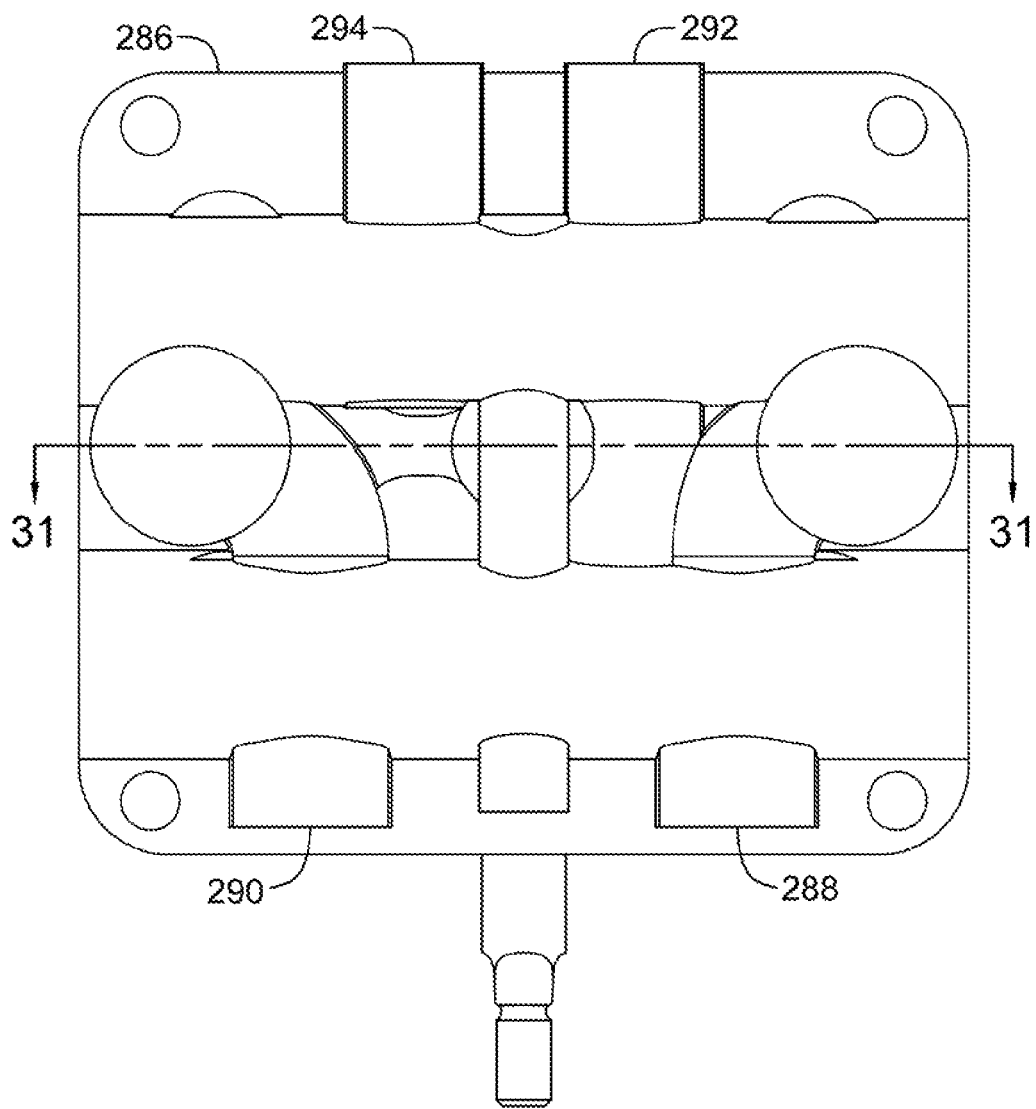
FIG. 30 is a plan view of certain elements of the sixth embodiment.
Figure 31:
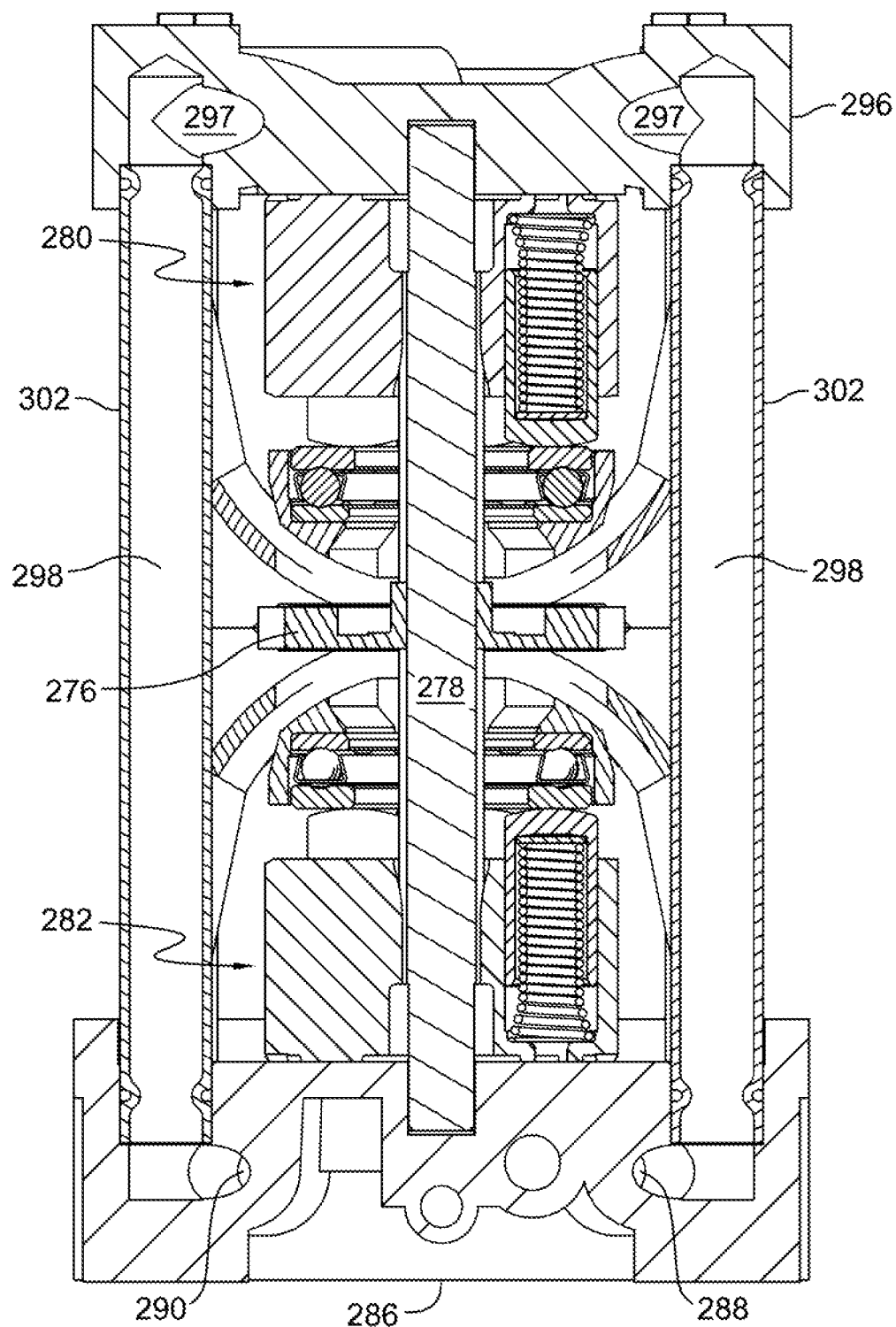
FIG. 31 is a cross-sectional view of the sixth embodiment along the line 31-31 in FIG. 30.

As shown most clearly in FIGS. 29 and 31, tubes 302 have passages 298 formed therein, which hydraulically connect ports 288 and 290 in plate 286 to passages 297 in plate 296. Passages 297 in plate 296 are connected hydraulically to pump 280. Ports 292 and 294 are connected hydraulically to pump 282 by way of passages formed in support plate 286.

Cradle bearing supports 304 and tubes 302 also provide structural support to the assembly. Fasteners 300 attach support plate 296 to support plate 286, thereby compressively retaining tubes 302, cradle bearing supports 304, shaft 278 and gear 276 therebetween. In the embodiment shown, fasteners 300 are adjacent to and partially surrounded by cradle bearing supports 304.

The various embodiments described above use the crankshaft to drive the pumps. However, it is anticipated that other shafts may be used to drive the pumps. For example, the cam shaft may also be used to drive the pumps, or additional shafts may be interposed between the crankshaft (or the cam shaft) and pump shafts to drive the pumps. The various embodiments also are described in terms of two pumps. However, a single pump could be used and a person of skill in the art could use the principles of the present invention to apply the present invention to three or more pumps.

While specific embodiments have been described in detail, it will be appreciated by those skilled in the art that various modification and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

The invention claimed is:

1. A pump support comprising:
a first side wall;
a second side wall spaced apart from the first side wall;
a first bearing support between the first side wall and the second side wall, the first bearing support configured to rotatably receive a first pump shaft of a first pump;
a second bearing support between the first side wall and the second side wall, the second bearing support configured to rotatably receive a second pump shaft of a second pump;
a first trunnion support between the first side wall and the second side wall, the first trunnion support configured to rotatably receive a first trunnion; and
a second trunnion support between the first side wall and the second side wall, the second trunnion support configured to rotatably receive a second trunnion.

2. The pump support of claim 1, wherein the first side wall includes a first plurality of elongate members defining a first plurality of openings therebetween.

3. The pump support of claim 2, wherein the second side wall includes a second plurality of elongate members defining a second plurality of openings therebetween.

4. The pump support of claim 1, wherein the first side wall and the second side wall are parallel.

5. The pump support of claim 1, wherein a longitudinal axis of the first trunnion support and a longitudinal axis of the second trunnion support are coaxial.

6. The pump support of claim 1, wherein a longitudinal axis of the first bearing support and a longitudinal axis of the second bearing support are parallel.

7. The pump support of claim 1, wherein a longitudinal axis of the first trunnion support and a longitudinal axis of the second trunnion support are perpendicular to a longitudinal axis of the first bearing support and a longitudinal axis of the second bearing support.

8. The pump support of claim 1, further comprising a first pivot support between the first side wall and the second side wall and between the first trunnion support and the second trunnion support, the first pivot support configured to contact a first swash plate body.

9. The pump support of claim 8, further comprising a second pivot support between the first side wall and the second side wall and between the first trunnion support and the second trunnion support, the second pivot support configured to contact a second swash plate body.

10. The pump support of claim 9, wherein the first pivot support, the second pivot support, the first trunnion support and the second trunnion support share a common, coaxial longitudinal axis.

11. The pump support of claim 1, further comprising at least one cross-member connecting the first side wall and the second side wall.

12. A pump assembly comprising:
a support surface attached to a housing and supporting a first pump and a second pump; and
a pump support attached to the support surface and separate from the housing, the pump support comprising:
a first side wall and a second side wall spaced apart from the first side wall;
a first bearing support for a first pump shaft, the first bearing support being disposed between the first side wall and the second side wall and having a first longitudinal axis; and
a second bearing support for a second pump shaft, the second bearing support being disposed between the first side wall and the second side wall and having a second longitudinal axis parallel to the first longitudinal axis.

13. The pump assembly of claim 12, further comprising;
a first trunnion support between the first side wall and the second side wall, the first trunnion support having a third longitudinal axis; and a second trunnion support between the first side wall and the second side wall, the second trunnion support having a fourth longitudinal axis coaxial with the third longitudinal axis.

14. The pump assembly of claim 13, further comprising;
a first pivot support between the first side wall and the second side wall and between the first trunnion support and the second trunnion support, and
a second pivot support between the first side wall and the second side wall and between the first trunnion support and the second trunnion support.

15. The pump assembly of claim 14, wherein the first side wall includes a first plurality of elongate members defining a first plurality of openings therebetween, and the second side wall is parallel to the first side wall and includes a second plurality of elongate members defining a second plurality of openings therebetween.

16. The pump assembly of claim 14, further comprising a first swash plate contacting the first pivot support and engaged to the first pump, and a second swash plate assembly engaged to the second pump and contacting the second pivot support.

17. A pump assembly comprising:
a first pump disposed on a support surface and in hydraulic communication with a hydraulic porting system, the first pump including a first pump shaft driven by a first pump gear;
a second pump disposed on the support surface and in hydraulic communication with the hydraulic porting system, the second pump including a second pump shaft driven by a second pump gear, wherein a distance between an axis of rotation of the first pump shaft and an axis of rotation of the second pump shaft is less than a sum of: (a) a minor radius of the first pump gear, and (b) a minor radius of the second pump gear.

18. The pump assembly of claim 17, further comprising a pump support attached to the support surface for retaining the first pump and the second pump against the support surface, the pump support including a first bearing support rotatably receiving the first pump shaft and a second bearing support rotatably receiving the second pump shaft.

19. The pump assembly of claim 17, wherein the first pump gear and the second pump gear are driven by a common drive gear.

20. The pump assembly of claim 17, wherein the first pump further comprises a first swash plate rotatable by a first trunnion and the second pump further comprises a second swash plate rotatable by a second trunnion, and the first trunnion and the second trunnion have a common axis of rotation that is perpendicular to the axes of rotation of the first and second pump shafts.

21. A pump assembly for mounting with a pump support structure, the pump assembly comprising:
an axial piston pump for mounting on a pump support surface, the axial piston pump comprising a cylinder block for fluid communication with a hydraulic porting system and a plurality of pistons disposed in the cylinder block;
a swash plate engaged to the plurality of pistons and rotatable about an axis of rotation by means of a trunnion, the swash plate comprising a first side and a second side opposite to the first side along the axis of rotation, a first engagement structure on the first side of the swash plate to engage the trunnion, and a second engagement structure on the second side of the swash plate to engage a pivot support on the pump support structure, wherein the first engagement structure is substantially symmetrically identical to the second engagement structure.

22. A pump assembly comprising:
a first pump comprising a first cylinder block disposed on a support surface, a first set of pistons disposed in the first cylinder block, a first pump shaft driving the first cylinder block and having a first axis of rotation, and a first swash plate engaged to the first set of pistons and rotatable about a second axis of rotation by means of a first trunnion; and
a second pump comprising a second cylinder block disposed on the support surface, a second set of pistons disposed in the second cylinder block, a second pump shaft driving the first cylinder block and having a third axis of rotation that is parallel to the first axis of rotation, a second swash plate engaged to the second set of pistons and rotatable about a fourth axis of rotation by means of a second trunnion;
wherein the first swash plate and the second swash plate are substantially identical in appearance, and both swash plates include a first engagement structure on one side of the swash plate to engage its respective trunnion, and a second engagement structure on the second side of the swash plate, wherein both of the first engagement structures are substantially symmetrically identical to both of the second engagement structures.

23. The pump assembly of claim 22, further comprising a pump support attached to the support surface for retaining the first pump and the second pump against the support surface, the pump support comprising:
a first bearing support rotatably receiving the first pump shaft and a second bearing support rotatably receiving the second pump shaft; and
a first pivot support structure for engaging the second engagement structure of the first swash plate, and a second pivot support structure for engaging the second engagement structure of the second swash plate.

* * * * *